(12) United States Patent
Gochnour

(10) Patent No.: US 8,109,471 B2
(45) Date of Patent: Feb. 7, 2012

(54) TUBULAR SHAPED INTERSTELLAR SPACE CRAFT

(76) Inventor: Gary Gochnour, Seattle, WA (US)

(*) Notice: Subject to any disclaimer, the term of this patent is extended or adjusted under 35 U.S.C. 154(b) by 339 days.

(21) Appl. No.: 12/291,860

(22) Filed: Nov. 14, 2008

(65) Prior Publication Data

US 2009/0127383 A1    May 21, 2009

Related U.S. Application Data

(60) Provisional application No. 61/003,026, filed on Nov. 14, 2007.

(51) Int. Cl.
*B64G 1/40* (2006.01)
(52) U.S. Cl. .................................................. 244/171.5
(58) Field of Classification Search ............... 244/171.5
See application file for complete search history.

*Primary Examiner* — Tien Dinh
*Assistant Examiner* — Michael Kreiner
(74) *Attorney, Agent, or Firm* — Garth Janke

(57) ABSTRACT

The invention relates to a plasma based aircraft possessing a magnetic field, and a plasma vortex. The craft is tubular in shape. The craft has a vast array of capacitors. The craft also has a proton accelerator, plasma guns, and diversion devices. The craft will approach the speed of light, over time. The craft obtains fuel direct from an atmosphere or a radiation induced atmosphere in space, at no cost, similar to our Moon's radiation induced atmosphere of the noble gases. The craft can travel to a gk star, for only the cost of construction of craft.

The craft has three on-board escape, exploratory craft. The craft produces plasma vortices within an electromagnetic field. The field is an inhomogeneous, diamagnetic, orbiting plasma field, with a magnetohydrodynamic electrically conducting plasma current.

The craft possesses approximately seven uninsulated, tungsten bands, encircling craft.

19 Claims, 12 Drawing Sheets

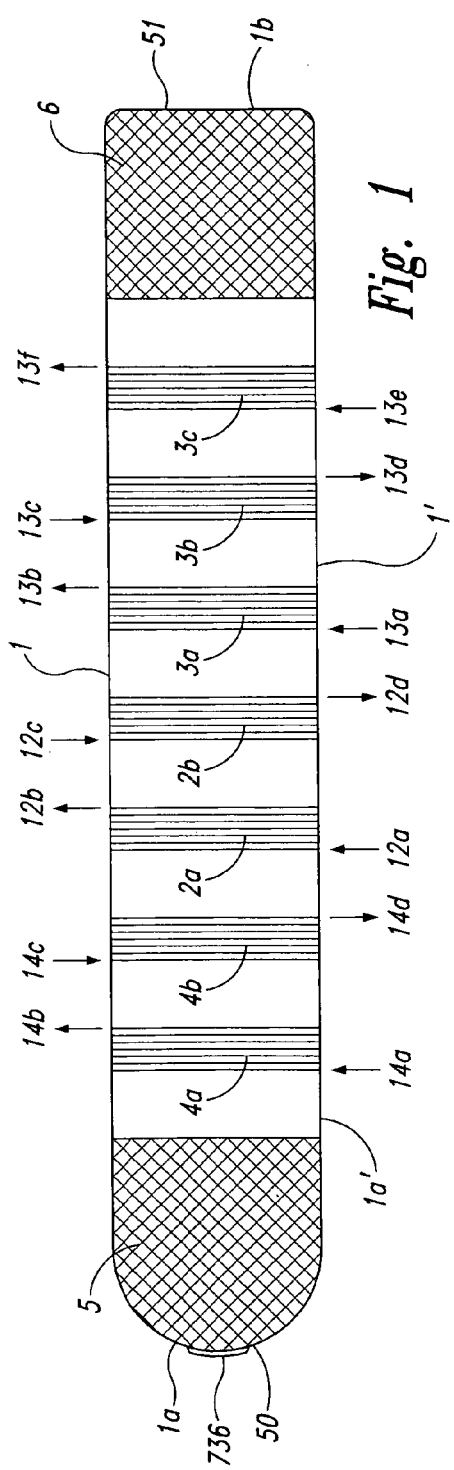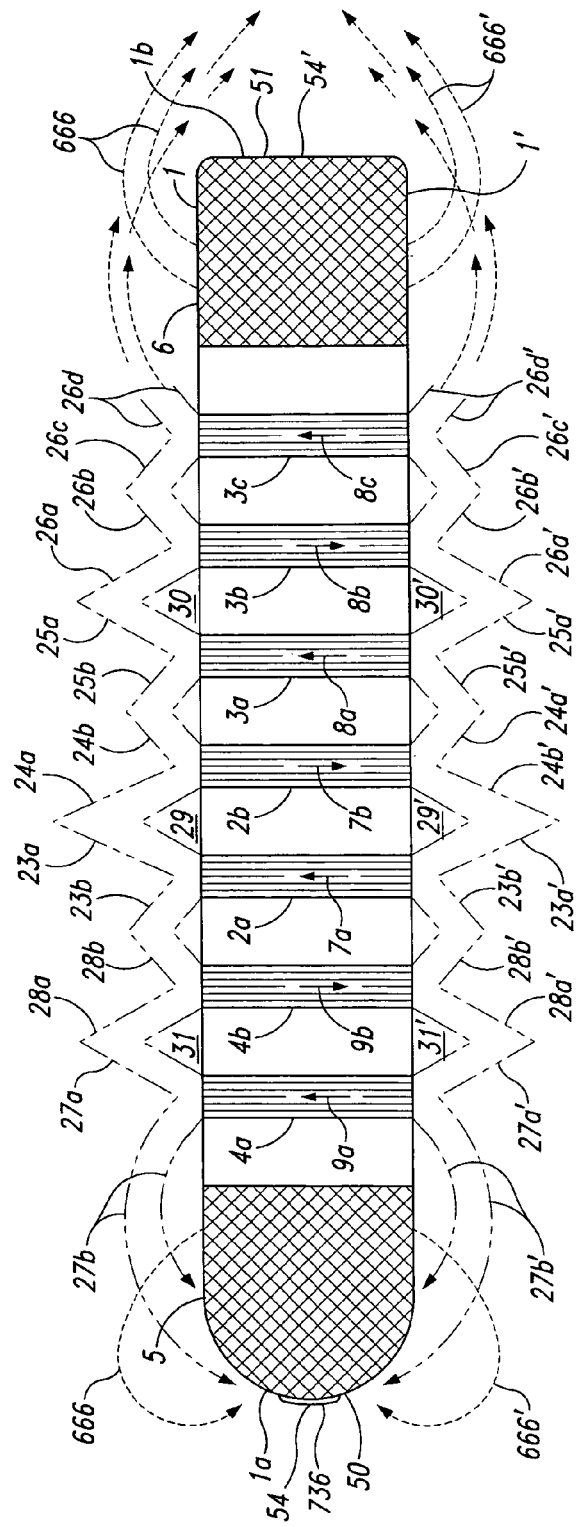

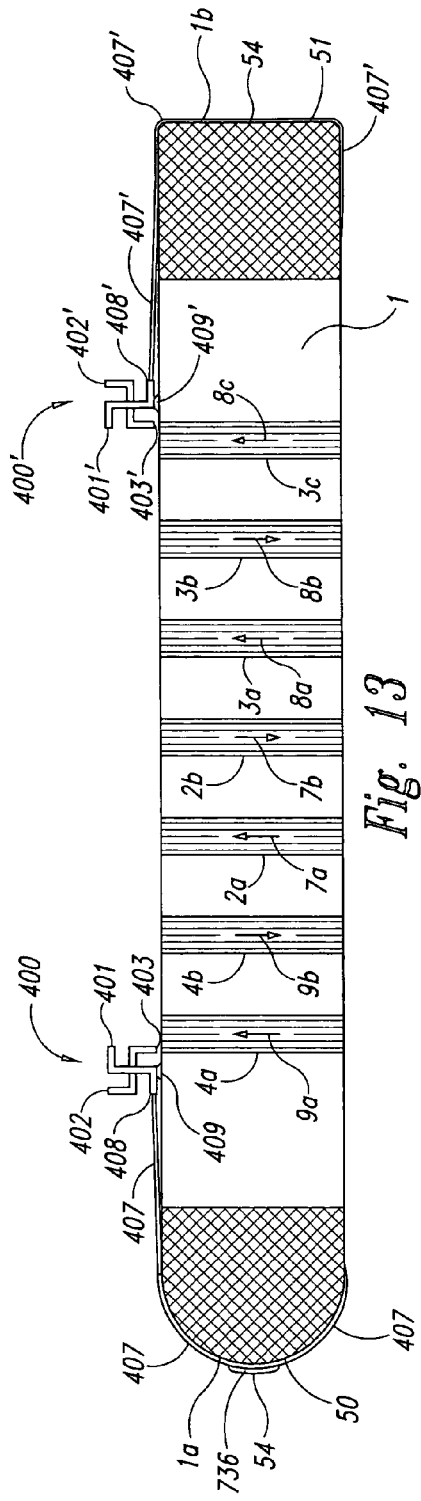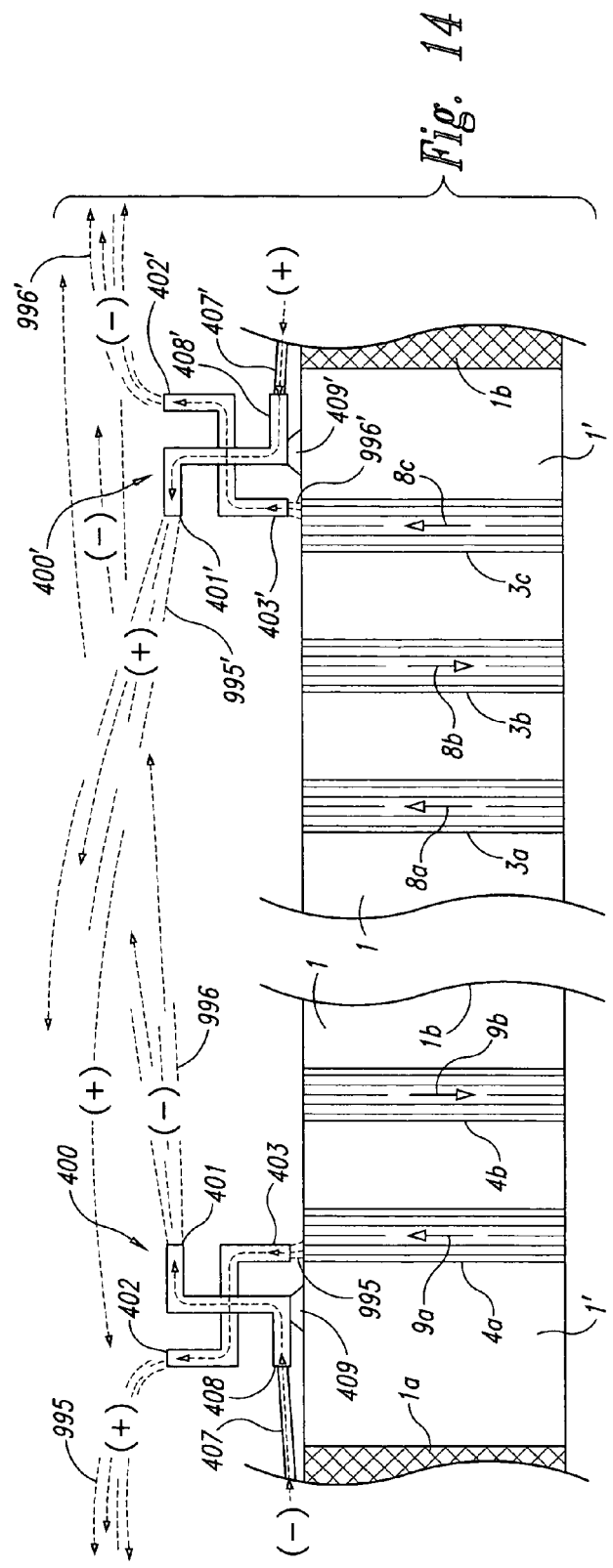

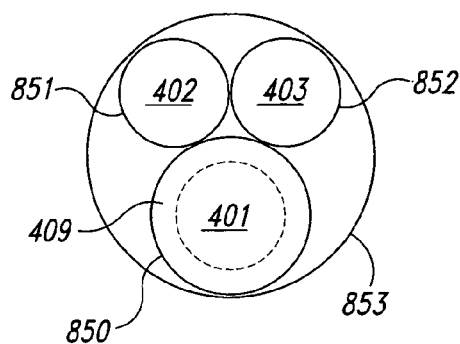
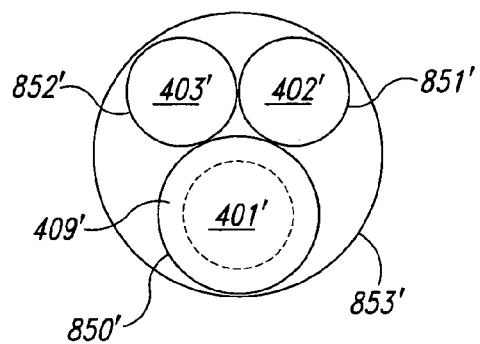
Fig. 14A    Fig. 14B
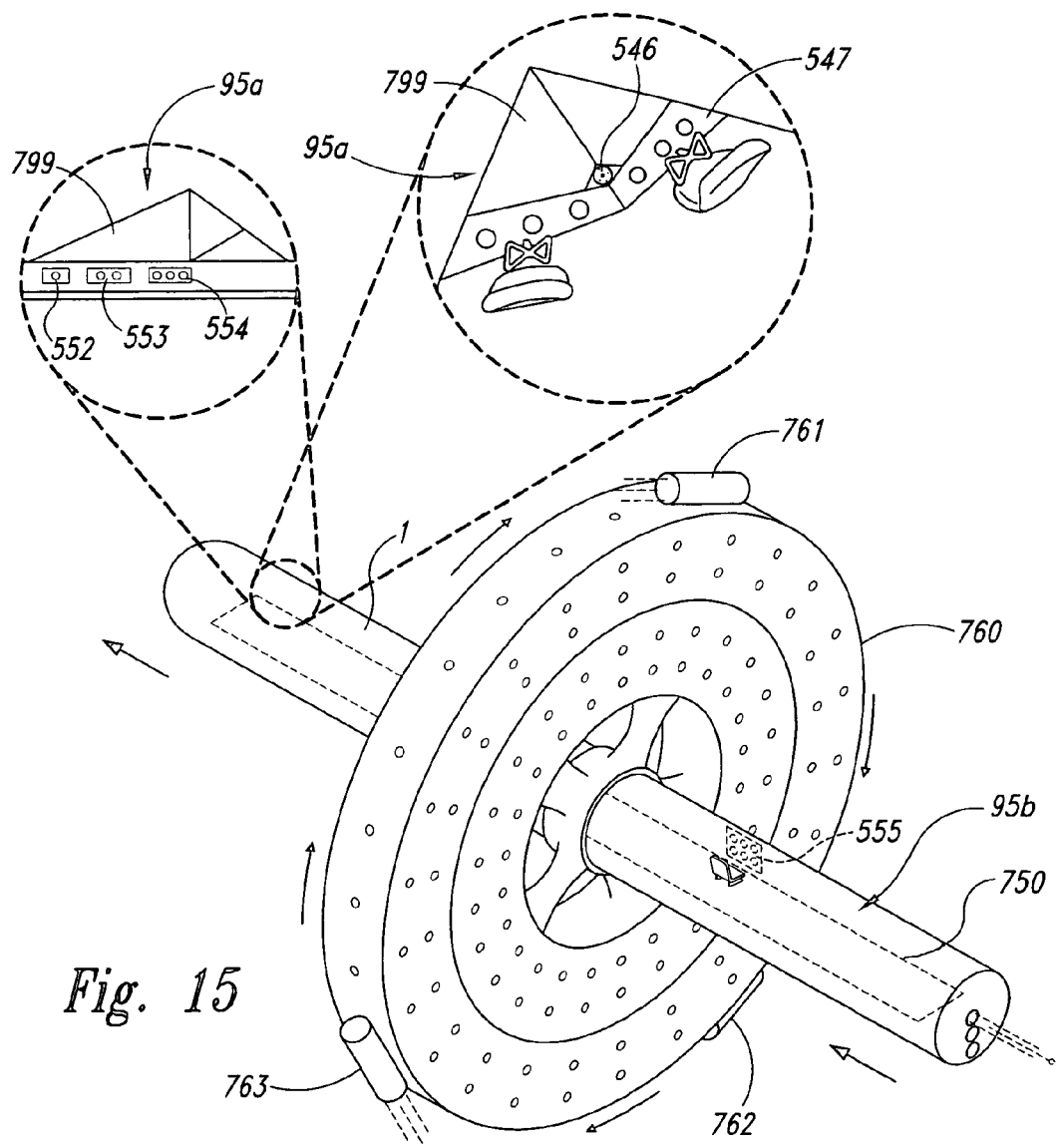
Fig. 15

TUBULAR SHAPED INTERSTELLAR SPACE CRAFT

CROSS REFERENCE TO RELATED APPLICATIONS

This application claims the priority to provisional patent application Ser. No. 61/003,026, filed 2007, Nov. 14, by present inventor.

BACKGROUND OF THE INVENTION

1. Field of Invention

This application relates to an electromagnetic, plasma based aircraft, capable of operation in the atmosphere as an aircraft, underwater as a submersible craft, in outer space as a space craft. A space craft capable of interstellar space travel to other planets, outside our solar system.

This craft does not require fuel to be provided for aircraft operation. Fuel can be obtained from an atmosphere to include radiation induced atmospheres comprised of the noble gases.

2. Prior Art

The only known relevant prior art, is applicant's prior patent titled: A multi-functional high energy plasma aircraft and nuclear fusion system to produce energy from a controlled nuclear fusion reaction. Referenced patent is pending and was filed on 23 Mar. 2007 with application Ser. No. 11/728,080, and claiming benefits of previous applications back to 6 May 2003.

OBJECTS AND ADVANTAGES

This invention will permit travel in space. In view of a near miss of the earth by an asteroid during a recent tsunami, an asteroid impact that would have put us into the ice ages, and, in view of expected impacts by this asteroid in 2029 or 2036, this patent is highly opportune. The orbits of only ten percent of the asteroids are known. This craft is also a decontamination device within an atmosphere.

SUMMARY OF THE INVENTION

In the present invention, a tubular shaped aircraft, is also a space craft, as well as an interstellar space craft. The craft is tubular in shape in preferred embodiment, though a general rectangular shape would be recommended in most larger versions of craft. This tubular craft will possess an oscillatory circuit having capacitance and inductance in the preferred embodiment. An extensive array of capacitors will provide required capacitance, and an inductance coil will provide inductance, or by having inductance distributed throughout the length of a long tubular shaft, with capacitance within sections, is also a recommended embodiment. The capacitors will be connected in parallel. Electromagnetic radiation will be emitted from both ends of the inductance coil within an inductance shaft.

Pliable tungsten wires, formed to be cables, will be wrapped to form seven separate bands around the exterior surface of the craft, in preferred embodiment. Exterior wiring on outer surface of the craft is uninsulated. Interior wiring will be insulated in preferred embodiment. The inductance coil upon initiating operation of craft, will establish an applied magnetic field around craft. The craft will be comprised of a ferromagnetic material, and will be raised to high magnetic fields, and consequent high electric fields, by the energetic charged particles released by current within the uninsulated wires now orbiting the craft in orbits within the applied magnetic field of this ferromagnetic craft. The orbiting particles will organize into concentric bands of electrons and then protons, increasing in energy as the bands narrow. The general shape of the bands will form a plasma vortex moving toward the north pole of craft, and a plasma vortex moving toward the south pole, both vortices moving from the center of craft, and increasingly magnetizing the craft, best seen in FIGS. 1, 2, 3 and 4A.

This craft has few, if any moving parts, other than an array of plasma guns for navigation, propulsion, or defense. Navigation of craft will be with electric controls, similar, if not identical to controls used by pilots in modern airliners, and with similar navigational controls. The plasma based tubular craft will require an engineer for plasma diagnostics. The large size of the tubular craft will permit ready utilization of existing plasma diagnostics technology.

This craft will possess a proton accelerator located within center of craft, running from north pole to the south pole. As the plasma vortices narrow toward the north pole, protons impacting a cobalt steel cap in the front, will impact and divert to the left, providing fuel for the proton accelerator. In the rear of craft electrons will impact and divert to the right, from the cobalt steel cap, and the electrons will bind with the exiting protons which otherwise, would be attracted back to a now negatively charged craft, with loss of propulsive thrust. In the rear of craft, the vortex moving from center of craft toward the south pole, also narrowed providing electrons to neutralize the exiting protons. In the front of craft, impacting electrons divert to the right. Impacting protons in rear of craft will divert toward the front of craft. To accelerate this potential fuel, diversion devices at both the north end of craft, and the south end of craft, will propel diverted particles to opposite ends of craft, as shown in drawings FIGS. 13 and 14.

This tubular craft will also possess a superconducting ring to store accumulated energy. On earth superconducting rings are not now energy efficient due to temperature requirements for cooling. In space, the low temperatures, near absolute zero, will permit operation of superconducting rings in rooms utilizing outside temperatures for cooling at desired temperature.

The tubular craft, within an atmosphere, can utilize the plasma vortices surrounding the craft, for propulsion. As the craft has a magnetohydrodynamic electrically conducting plasma current in the magnetic field, the protons within the plasma vortices will be pulled to the right also. The rotational direction for both the top vortex and the bottom vortex will be to the right, a rotational direction for upward movement by electromagnetic equations. This mode of propulsion can be used by this tubular craft within an atmosphere, concurrent with the proton accelerator or plasma guns.

A complement of at least three smaller plasma based escape craft, also called exploration craft, will be carried by the tubular craft, for which a patent has been applied for, referenced in prior art. Both sides of the tubular craft are identical, except for FIG. 9, showing an escape door only on the right side of craft. The left side of craft does not have an escape door. Advanced electromagnetic equations predicted a craft surrounded by energetic charged particles would have a downward thrust.

BRIEF DESCRIPTION OF THE DRAWINGS

FIG. 1 is a right side view of the tubular craft. Also shown is a right side view of seven bands of uninsulated wires encircling the craft. Also shown is an electric current entrance arrow on underside of craft, and a strong current exit arrow on top of craft in the first band set, near front of craft, subsequent bands have alternating direction for location of entrance and exit arrows. Cobalt steel impact caps are also shown on the rounded front of the craft, and on the rear of the craft. current entrance arrow on underside of craft, and a strong current exit arrow on top of craft in the first band near front of craft, subsequent bands have alternating direction for location of entrance and exit arrows. Cobalt steel impact caps are also shown on the rounded front of the craft, and on the rear of the craft.

FIG. 2 is a right side view of the craft, also showing a visible rendition of effusions of energized particles projected at right angles to the electric and magnetic fields, with the electric and magnetic fields being at right angles to each other.

FIG. 13 is a right side view of craft showing a front and a rear diversion device located on top of craft, also shown are electrodes on front of craft, and electrodes on rear of craft.

FIG. 14 shows a left sectional enlarged view of a front diversion device, and a right sectional enlarged view of a rear diversion device.

FIG. 14A shows a front top aperture to extrude or extract a collapsed front diversion device, with a removable hatch cover.

FIG. 14B shows a rear top aperture to extrude or extract a collapsed rear diversion device, with a removable hatch cover.

FIG. 15 is a tubular interstellar space craft, with a detachable, rotating living module, with three rotating propulsion elements.

DESCRIPTION OF THE PREFERRED EMBODIMENT

Operation of the Craft

Figure 3:
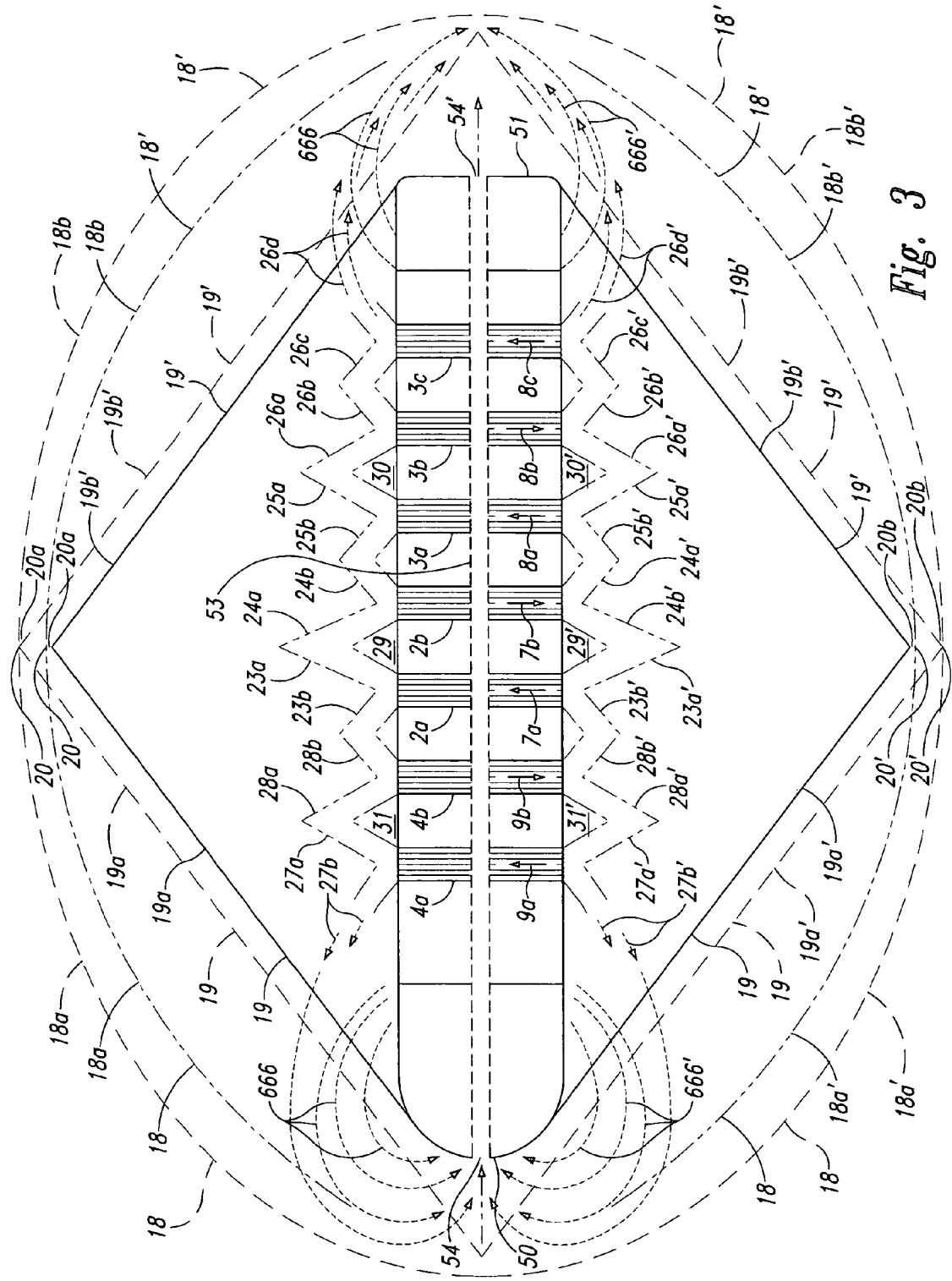
FIG. 3 is a right side view of craft, showing a cutaway side view of a proton accelerator located through the center, from the front to the rear of the craft. Also shown is the applied magnetic field encircling the craft, and within the applied magnetic field is a diamond shaped plasma field.

Beginning a description of the preferred embodiment of the operation of the craft, also called an aircraft, a space craft, an interstellar space craft, as well as a submersible craft, but hereinafter, referred to as a craft, or the above.

Referring to FIG. 1, a preferred embodiment of the craft is shown. The craft is comprised of a ferromagnetic tungsten steel hull 1, 1', in preferred embodiment, though chromium steel is also recommended. Tungsten has the strongest longitudinal strength of the metals. The bands around the craft, are first wound to form cables, and are then wound to form tungsten bands around craft.

Referring to FIGS. 1 and 2, insulated copper wire enters onto surface of craft as uninsulated tungsten wire, at wire entrance area 14a. The tungsten wire is wound to form band 4a, and will exit surface of craft at exit area 14b, back into craft, and reconnection to interior insulated copper wire system 97, FIG. 12. The adjacent band to band 4c, band 4b, is formed by wire entering onto surface of craft at entrance area 14c, the uninsulated tungsten wire will be wound in an opposite direction to band 4a, best exemplified in FIG. 2 by current direction arrows 9a and 9b, both arrows showing opposite direction of current within current carrying wire. This arrangement of the current carrying wire, will permit the electrons, projected with a lorentz force from craft surface, at right angles to the craft magnetic and electric fields, said fields being at right angles to each other, the electrons will be projected as shown in FIG. 2, effusion 27a, 27a', being the ionized electrons emitted from band 4a.

Electrons are projected to the right from band 4a, and electrons are also projected to the right from adjacent band 4b, in FIG. 2. The emitted particles form effusion 27a, 27a' from band 4a, and effusion 28, 28a is formed from band 4b. The coalescing bands of electrons from band 4a and 4b, form a more energetic and physically higher band, than the adjacent set of bands, 2a and 2b, comprised of less energetic protons, with a resultant, lower pyramidal formation at effusion junction 28b, 28b' and 23b, 23b'. The central set of bands produced by electrons 23a, 23a', coalesced with electrons 24a, 24a', has a higher pyramidal shape due to increased number of wound wires comprising bands. The central, highest pyramidal shaped band is necessitated by increased quantity of particles required to form the overarching plasma field 19, 19', FIG. 3 and best seen in FIG. 4A.

Figure 4:
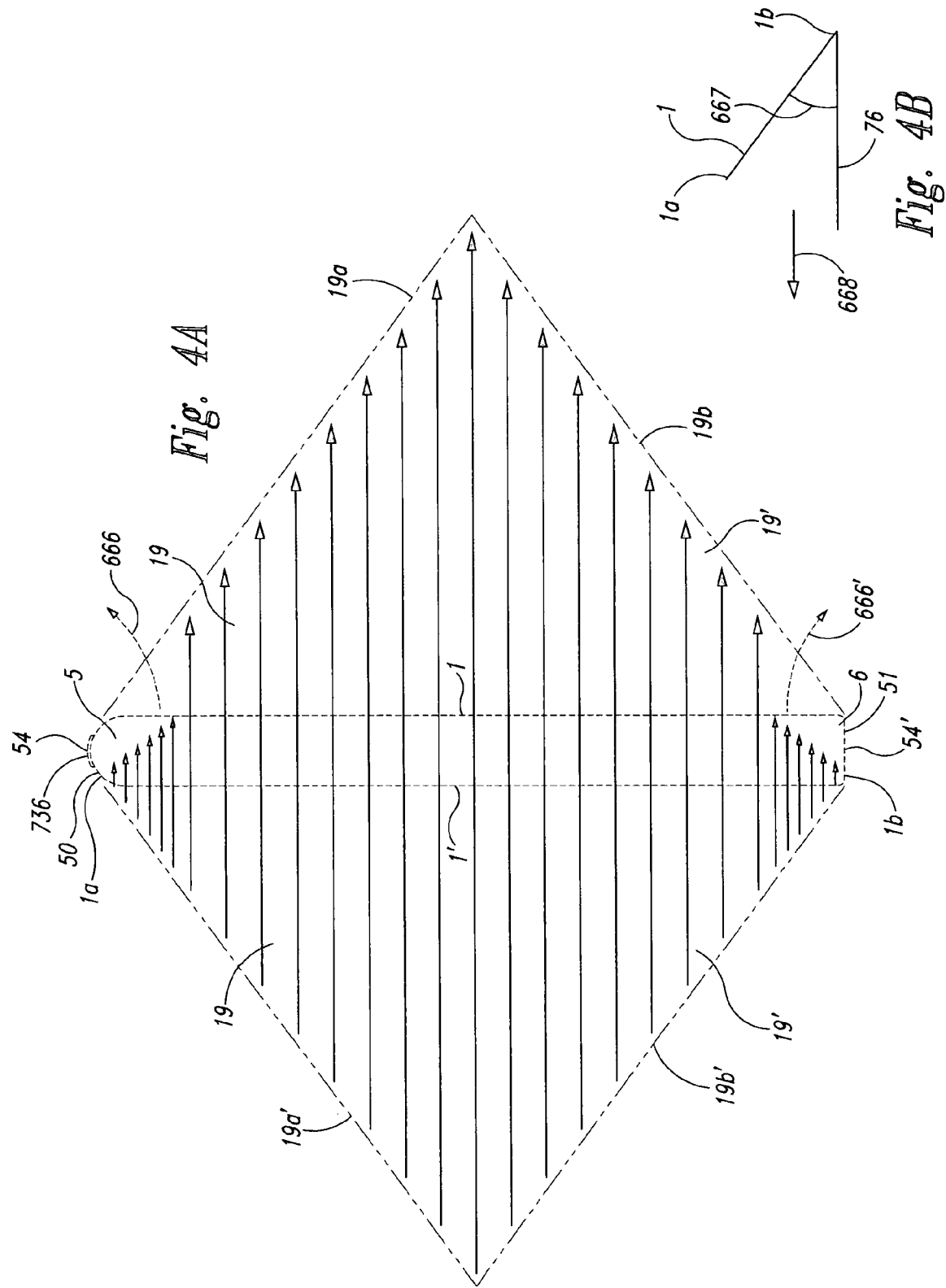
FIG. 4A is a right side view of the craft in a perpendicular position inside a surrounding plasma field of concentric bands of protons and then electrons, both rotating to the right as indicated by arrows. Also shown is impact area on front cap at arrows producing protons for proton accelerator, and impact area on rear cap producing electrons to neutralize exiting protons.
FIG. 4B below FIG. 4A and to the right, shows a representation of the aircraft at, an angle to a horizontal earth with the arrow indicating the direction of travel with combined propulsion from the proton accelerator and propulsive effect of the rotating plasma vortices.

Referring to FIGS. 3 and 4A, the sets of similar charged effusions, after coalescing and with increased charge, will project into larmor orbits of inhomogeneous, diamagnetic rotating particles, forming the plasma field 19, 19, FIG. 4A. Concentric bands of electrons and then protons will be formed. FIG. 4A shows the formed plasma vortex 19, 19', and also shows the rotating, increasingly more energetic bands of electrons and then protons, narrowing as they increase in energy over time, as their velocity increases to near the speed of light.

Near the magnetic north pole 50, FIG. 3, energetic charged particles, protons, will impact cap 5, and deflect to the left, into the proton accelerator entrance 54, FIG. 3. Impact protons 666, FIG. 4A, from off impact cap 5, FIG. 4A, and proton effusions 27*b*, and 27*b'*, FIG. 3, are from different sources. Protons 666 are from impact cap 5, FIG. 3, best seen in FIG. 4A. The proton effusion 27*b*, 27*b'*, FIG. 2, from the tungsten band 4*a*, is from a separate source, from the narrowing plasma vortex 19, 19', FIG. 4A, produced particles, protons and electrons. Proton particles 666, FIG. 4*a*, and electron particles 666', FIG. 4A, are impacting the front, proton particles, and rear, electron particles, impact caps 5 and 6, FIG. 4A, with protons deflecting to the left as fuel for the proton accelerator 54, FIGS. 3 and 4A. On the bottom half of plasma 19, 19', FIG. 4A, the concentric rows of protons and then electrons, will narrow as they increase in energy toward the north pole and the south pole.

Primarily electrons 666', FIG. 4A, will deflect to the right and bind with and neutralize exiting protons from proton accelerator, thereby preventing the protons from being attracted back to a now negatively charged craft. When the ions are first formed and projected into larmor orbits within the rotating plasma fields, they are traveling at approximately 5,000,000 miles per hour. After being projected with a lorentz force, and rotating and narrowing over time within the plasma vortices, the protons and electrons are traveling near the speed of light, highly energetic charged particles.

This is the fuel that will drive the interstellar space craft. This craft can be built now. FIG. 3 best shows the craft plasma field 19, 19', within the craft applied magnetic field 18, 18', FIG. 3. The true ratio of plasma 19, 19', and craft 1, 1', FIG. 3, should be approximately 1:6, that is, the plasma should be six times as wide as the craft, after developing. The plasma shown in FIG. 3, is only two and one half times as wide as the craft. The plasma field 19, 19', FIG. 3, should be a little more than twice as wide as shown in FIG. 3. The craft had to be enlarged to depict the mass of data required, and still remain readable, resulting in a foreshortening of the plasma. The plasma is comprised of energetic charged particles, the fuel that can enable man to travel to a g k star with planets. The craft possesses a magnetohydrodynamic electrically conducting plasma current within an applied magnetic field, this is part of the electric field 20, 20', FIG. 3, within the plasma field 19, 19', FIG. 3.

This magnetohydrodynamic current will pull the otherwise to the left rotating protons, to the right, within the rotating plasma vortices. Within the ionization process on the referenced tungsten bands, an excess of energetic electrons will be produced over the less energetic protons, resulting in the strong magnetohydrodynamic electric current within the plasma field, a conducting electric current.

Figure 5:
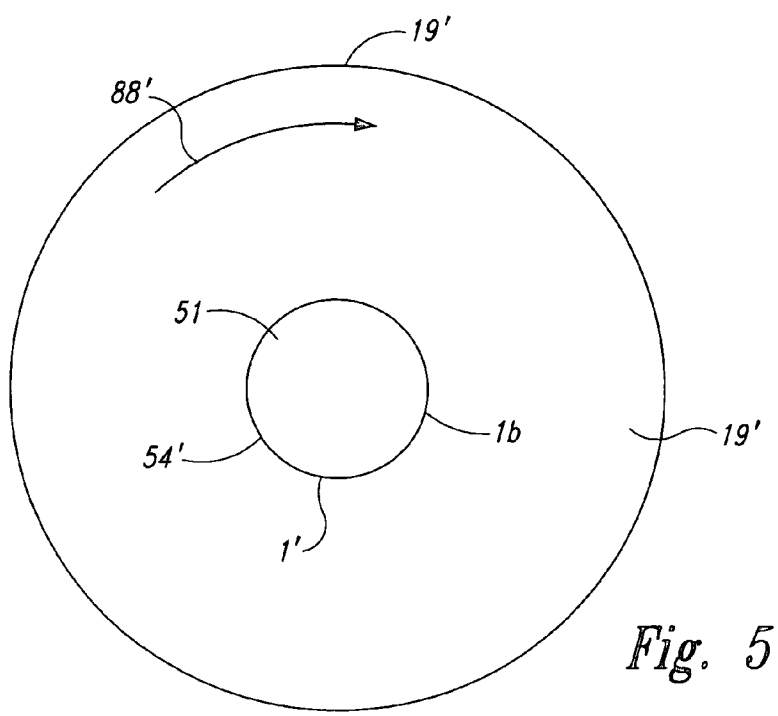
FIG. 5 shows a rear side view of the craft and the surrounding plasma field. A large arrow indicates rotational direction of plasma vortices when viewed from rear of craft.
Figure 6:
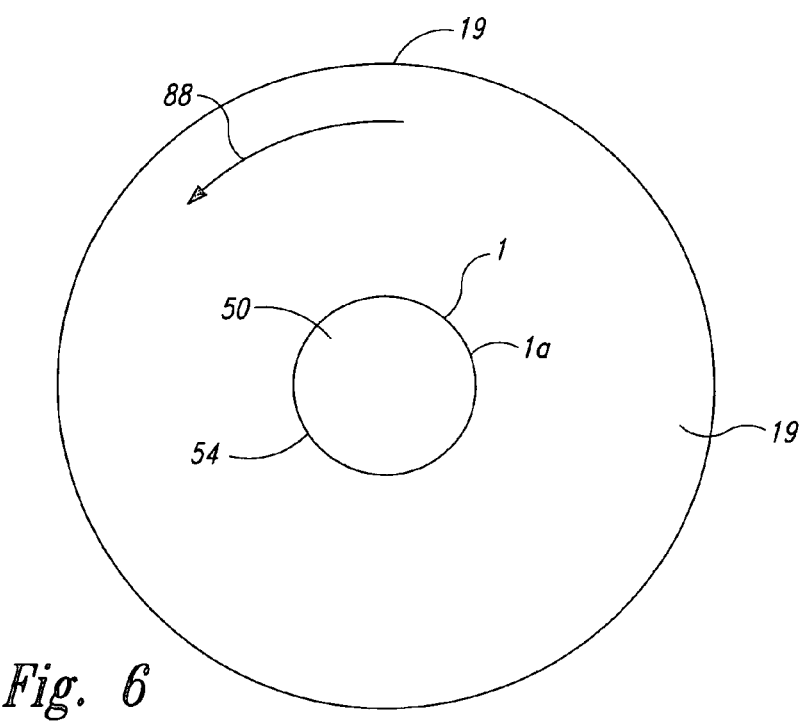
FIG. 6 shows a front side view of the craft and the surrounding plasma field. A large arrow indicates rotational direction of plasma vortices when viewed from front of craft

Referring to FIGS. 5 and 6, shown is a rear side view in FIG. 5, depicting a view of the craft plasma field 19, 19', and direction of movement of plasma current 88', at arrow, to the right. A motional direction for upward movement. Equations for movement of electromagnetic energetic charged particles, rotating to the right within an applied magnetic field, have already established a bottom propulsive effect for upward movement will be obtained. Up to the present invention, a suitable method had not been obtained for interstellar space travel. This invention will make interstellar space travel at small cost, possible. This craft will produce an abundance of highly energetic charged particles, direct from an atmosphere, at essentially no cost. It appears one of the primary functions of this craft will be, to divert protons to front of craft, and electrons to rear of craft.

Prior to pursuing the remaining aspects of craft operation, which will be described, some non-craft operational features have to be established and proposed. When the craft has accumulated sufficient energy within an atmosphere, and prepares to depart that body, most likely, there will exist something resembling our ionosphere or magnetosphere. To navigate through these impediments to forward progression, using said plasma vortices and a proton accelerator for propulsion, a most logical course would be to circumnavigate the planetary body, at increasing speed, and fling, project, the craft at a distant target, and traverse the intervening impediment, a magnetosphere. The distant target could be a sun, and then circumnavigate the sun at increasing speed, and again fling, project, the craft toward an even more distant target, craft destination. In this manner, the craft can preserve proton fuel within said plasma vortices, to be used for acceleration within a resistance free environment, outer space. After attaining a speed, an acceleration of the craft at 1 g, for 10 months, an acceleration man can easily tolerate for 10 months, craft propulsion system can be temporarily shut down, propulsion system being the proton accelerator in space, the plasma vortices only providing electromagnetic energy, not mass.

The acceleration period was brief, only a short span of time. This period of travel, 10 months of acceleration at 1 g, can easily be tolerated by man. At the end of 10 months, the craft will be traveling near the speed of light. After shutting down the proton accelerator, the craft can coast for the middle one third distance of the trip, at a speed near the speed of light. For the last one third distance of the trip, deceleration, the craft will be turned around while in flight. The front and rear plasma guns will turn the front of craft to the to the rear, and the rear of the craft to the front. The front pilot copilot cabin, will be retracted, and the rear pilot copilot cabin will be raised. The craft will now decelerate for the final third of trip, utilizing the remaining proton fuel within the plasma vortices.

In the above manner, fuel used traversing the earth's ionosphere and magnetosphere, and the sun's gravity belt, are avoided, and fuel is conserved.

The nearest g k sun with planets, recently found, is approximately four and one half light years from earth.

Figure 9:
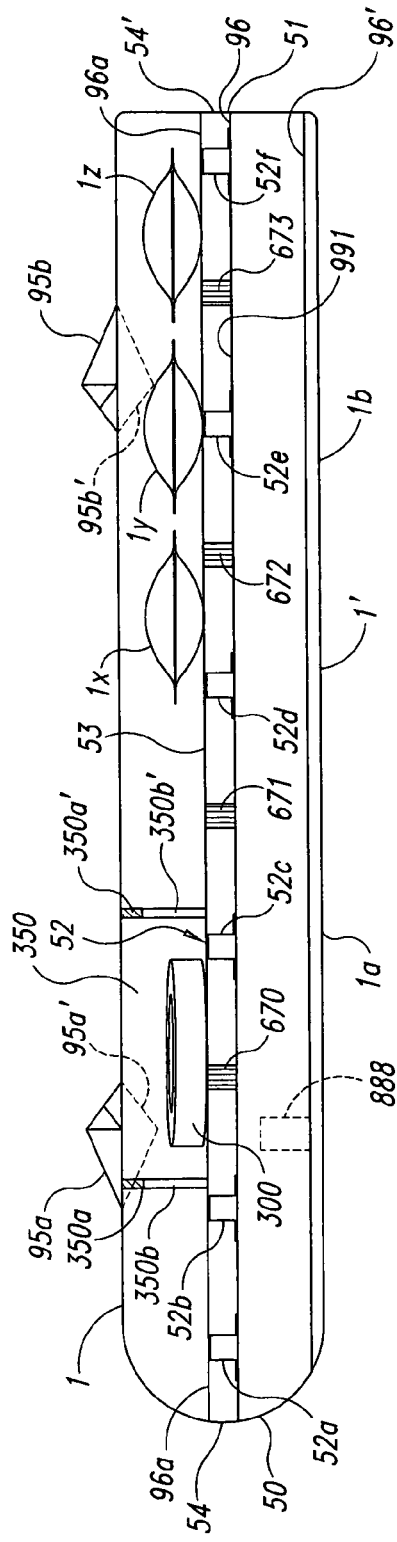
FIG. 9 is a cutaway right side view of craft showing a proton accelerator, a lower deck floor with dashed lines indicating an exit door from lower deck, and clamps to affix said proton accelerator to upper deck, alternators to accelerate protons, and a front retractable pilots cabin on top of craft, and a rear retractable pilots cabin on to of craft.

Referring to operation of the proton accelerator, FIG. 9, the fuel, protons, will enter the proton accelerator 53, FIG. 9, at proton entrance 54, FIG. 9. Also around front entrance to proton accelerator, is electrode 736, FIG. 2. Said electrode attracts protons, and electrode 407, FIG. 13, is used to capture and divert electrons. The proton accelerator 53, FIG. 3, best exemplifies the proton flow to the front of proton accelerator. Upon entering proton accelerator, the protons will be further accelerated in this linear proton accelerator, by properly spaced electrodes, approximately four, or more as required. Shown in FIG. 9 are alternating electrodes 670, 671, 672 and 673. As the craft has an alternating current component, in the craft fluctuating direct current, there will not be a cost factor for the alternating current. Ordinarily, alternating current has a high cost factor for production. There is no cost factor for operation of this craft, as the craft has no, or few, moving parts, the only cost factor, is initial cost of production of craft. Fuel is obtained free from the atmosphere.

A high temperature, heat resistant ceramic compound is recommended as material for proton accelerator. An electromagnetic field with a circular, concentrating force, a radiating spoke effect, can be used on interior surface of proton accelerator, to prevent contact of the highly energetic charged particles with accelerator. Preferred embodiment for material for proton accelerator is tungsten carbide steel.

Figure 11:
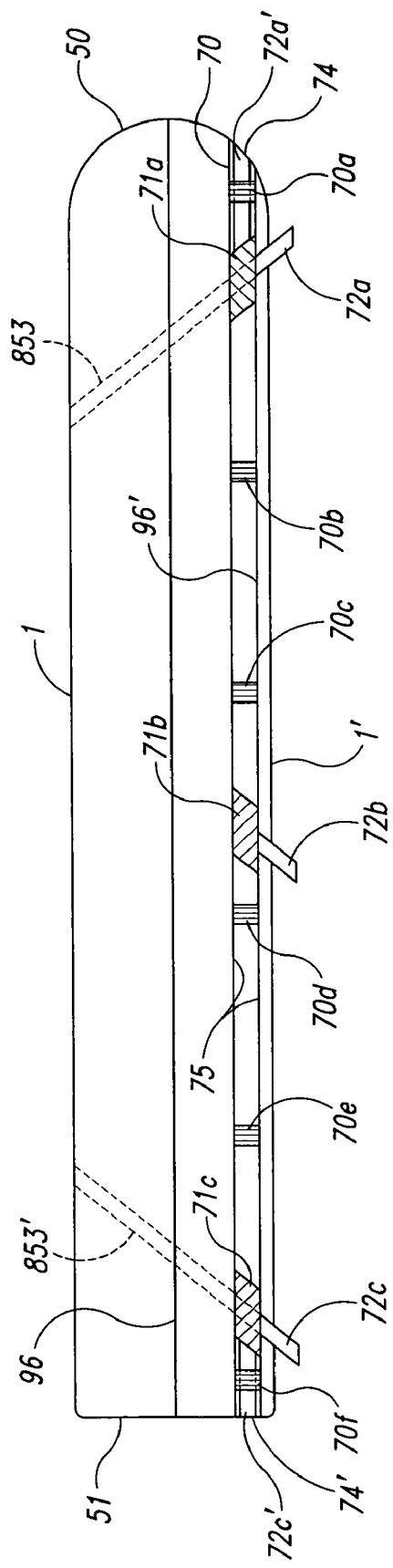
FIG. 11 is a left cutaway side view of craft showing three plasma guns with extended short shafts within a plasma gun shaft attached to lower deck by clamps. Upper deck is also shown.

Referring to operation of the plasma guns in plasma gun shaft 70, FIG. 11, three plasma guns 71*a*, in front, 71*b* in middle and 71*c* in rear of plasma gun shaft, each have differing number of plasma gun barrels. Plasma gun 71*a* has plasma gun barrel 72*a*' in front of craft, and 72*a*, below shaft in front of craft. Plasma gun 71*b* has only one plasma gun barrel, 72*b*, below center middle of craft, and plasma gun 71*c* has two gun barrels also, plasma gun barrel 72*c*', and plasma gun barrel 72*c*. Plasma gun linear accelerator shaft 853, is shown attached to plasma gun 71*a*. This plasma gun, linear plasma accelerator 853, is positioned to effect a lorentz force in a plasma current of immense force. The length of this highly accelerated plasma is in excess of 20 feet, and it is at a right angle to the electric and magnetic fields of the craft, the fields being at right angles to each other. This plasma can be directed out plasma gun barrel 72*a*', at front of shaft 74, or at plasma gun barrel 72*a*, on bottom of craft. A similar plasma gun, linear plasma accelerator shaft 853', is shown at back of craft, attached to plasma gun 71*c*. This rear plasma gun linear plasma accelerator is identical to front shaft 853, except for location. Plasma from the linear accelerator can be directed out the rear plasma gun barrel 72*c*', located at rear of plasma gun shaft 74', or plasma from the linear accelerator can be directed out the bottom of craft at gun barrel 72*c*. The interior positioning of these linear plasma accelerator shafts does not have to be vertical. The advantages of this plasma gun are the huge amount of available plasma, the large capacitor, pulsed current, and the extremely powerful magnetic, electric fields, and a lorentz force.

Figure 12:
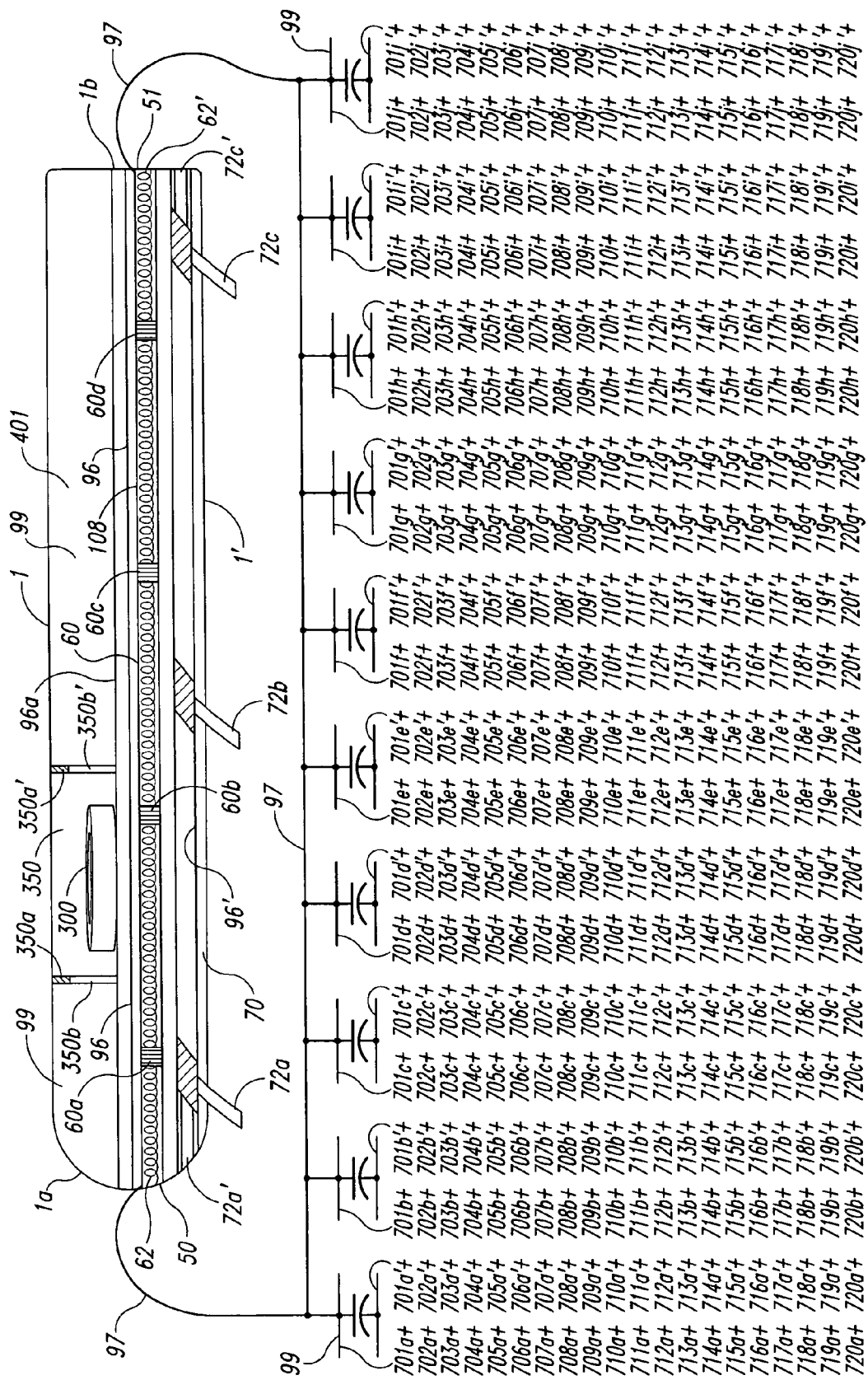
FIG. 12 is a cutaway right side view of craft showing a vast array of capacitors connected in parallel located on upper deck, three plasma guns within a plasma gun shaft, an inductance coil located within an inductance coil shaft, a superconducting ring located within an insulated superconducting ring containment room, and an area for storage of escape craft.

Referring to operation of the capacitor system 99, FIG. 12, a vast array of large asymmetrical capacitors, 200 sets, will be connected in parallel. The 200 capacitor sets will be connected to the top and bottom of an inductance coil 60, FIG. 12 and FIG. 10, establishing an oscillatory circuit with resistance from craft tungsten wiring, and resistors where required, and a zener diode where required. Resistors and a zener diode may not be required, but they are allowed for, if recommended. Constantin was a recommended material for uninsulated wiring, if used, resistors will be required, as constantin loses its resistance at approximately 1000 degrees centigrade, or higher.

The capacitor system 99, is connected to the electric system 97, connected to the inductance system which, in effect, is connected to both the electric system and the magnetic field. When the electric system, capacitor system exhausts available electric energy, it can access energy from the magnetic field, through the inductance coil. Energy produced by the plasma vortices is stored within the plasma vortices, and also within the capacitors. Aircraft controls access energy stored within the capacitors, to control the aircraft. To initiate craft starting operations, electricity from the capacitors is accessed. This can be a hazard, so this large craft has a superconducting ring 300, FIG. 12, which stores sufficient electric energy to power a city. Capacitors do not store electricity indefinitely, in fact, not for long at all. However, metal ions can be stored within capacitor plates as an emergency particle propulsion source in space. Available energy stored within the superconducting ring can recharge the capacitors prior to entering an atmosphere, where, at present, our superconductors will also require energy to function.

Material for capacitor plates in preferred embodiment, is magnesium. A recommended material is aluminum.

A preferred embodiment for material for windows in pilot copilot cabins, 95*a* and 95*b*, FIG. 9, is glass comparable to glass or compound used in deep diving bathyspheres. Bathysphere glass will be for window 799, FIG. 15, and window 799' as shown for cabin 95*b*, FIG. 9.

Figure 10:
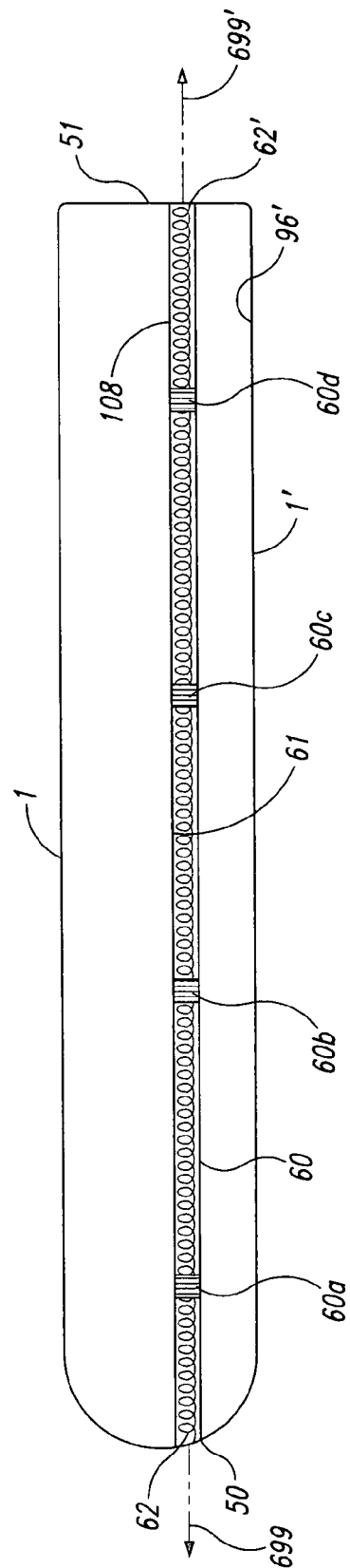
FIG. 10 is a cutaway right side view of craft showing an inductance coil located within an inductance coil shaft, affixed to upper deck by clamps, and arrows indicating direction of movement of emitted electromagnetic radiation from inductance coil.

Referring to the inductance coil, 60, FIG. 10, a preferred embodiment for material for inductance coil is copper. A preferred thickness for coils, is thick coils. A preferred insulation is enamel coating of coils, a thick coating.

Referring to craft diversion devices 400 and 400', FIGS. 13 and 14, shown are opposite faced diversion devices. Diversion device 400, positioned at front of craft, FIG. 14, is shown receiving electrons from front of craft through extended electrode 407, as shown at arrow showing electrons entering diversion device arm 408, and then projecting out the same charged particle at arm 401, and showing the cascade of electrons 996, headed for the rear of craft 1*b*, to bind with exiting protons to prevent their return to a now negatively charged craft, with loss of thrust. Also shown are protons emitted from band 4*a* as shown by arrow 9*a*, entering diversion electrode arm 403, and shown being trans-ported to arm 402 and being projected as a cascade of protons 995, toward the front of craft and into proton accelerator.

Referring to the right side of segmented craft 1', FIG. 14, showing diversion device 400', receiving protons from rear of craft through extended electrode 407', as shown at arrow by bracketed plus sign, showing protons entering diversion device 400', at electrode arm 408', and then projecting out the same charged particle at electrode arm 401', and showing the cascade of protons 995', headed for the front of craft 1*a*, as fuel for the proton accelerator. Also shown are electrons ionized off band 8*c*, to the right, at arrow 8*c*, entering diversion electrode arm 403', and then shown being transported to arm 402' at arrow, and being projected as a cascade of electrons 996', toward rear of craft to bind with exiting protons, to prevent their return to a now negatively charged craft, with loss of thrust.

Shown in FIG. 13, is a static depiction of diversion devices 400 and 400', showing the length of electrode arm 407, and the length of electrode arm 407', in rear of craft. The proximity of device 400 to device 400', is also shown.

The connection of device 400 and 400', FIG. 14, to craft electric system 97, FIG. 12, will be at diversion device connection stands 409 and 409', FIG. 14.

Referring to craft extrusion, retraction holes 853 and 853', FIGS. 14A and 14B, shown in FIGS. 14A and 14B, are small holes 402, 403 and 402' and 403', and large holes 401 and 401'. Small holes 402, 403, 402' and 403', are used to extrude, place on surface of craft, the arms of both diversion devices. 400 and 400', the large holes 401 and 401', FIGS. 14A and 14B, are used to extrude or retract diversion device connection stands. The craft extrusion, extraction large hole 853 and 853', FIGS. 14A and 14B, are also used by the craft as entrance or exit holes for the craft linear plasma accelerator 853 and 853', FIG. 11. The craft linear plasma accelerator also has other entrance exit apertures.

Referring to the craft detachable, rotating living module 760, FIG. 15, shown attached to the living module are small propulsion devices 761, 762 and 763, to rotate the module producing gravity effect. The small propulsion devices should operate on ambient electrons in space. Also shown is a blow-up of pilot copilot cabin 95*a*, an identical pilot copilot cabin is also located at rear of craft 95b. Pilot cabin 95a shows front window 799 in both blow-ups. The smaller blow-up shows pilot aircraft controls 552 for navigating craft with the plasma guns primarily, speed of craft will be controlled at controls 553, controlling speed of craft similar to controlling a jet aircraft, only the electric controls access increased fuel to the jet engines in a conventional aircraft, in this craft the electric controls access flow of protons to the proton accelerator. To lift front of craft with electric controls in a jet aircraft, exact same electric controls would be used in tubular craft, only in tubular craft plasma guns are accessed, but controls are same. To bank the craft 554, electric controls are again utilized, exactly the same, but again plasma guns are utilized in the tubular craft.

In the larger blowup in FIG. 15, aircraft control 546 is shown, depicting target destination in a distant solar system. Aircraft control gauges are also shown on panel 547, and steering controls, and pilot seats are also shown. In rear of craft a diagnostics control panel 555, for a plasma diagnostics engineer is shown. Direction of rotation of module effecting gravity is shown by arrows around living module 760. A water storage tank 750 is shown, It extends between bottom floor of craft 96', FIG. 7. The water tank 750, FIG. 15, is segmented equally, only a few feet will slosh around.

Figure 16A:
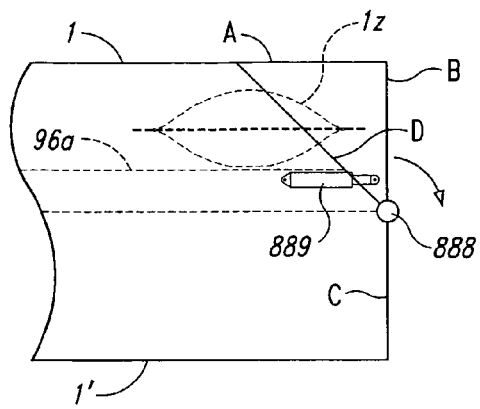
FIGS. 16A, 16B, 16C, and 16D, show a method for opening rear of craft using gravity, to launch an escape craft.
Figure 16B:
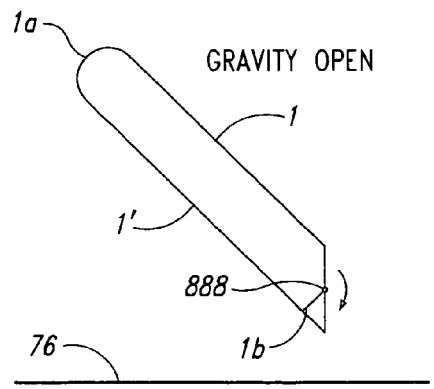
Figure 16C:
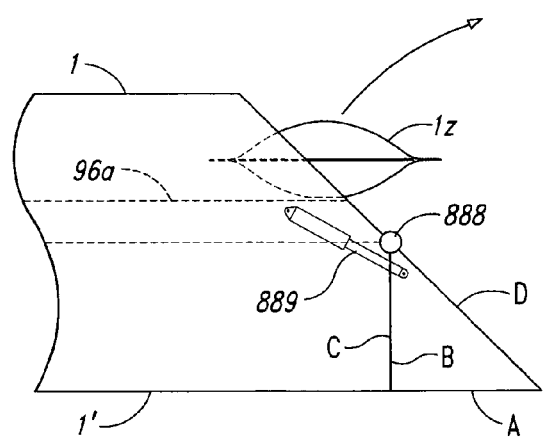
Figure 16D:
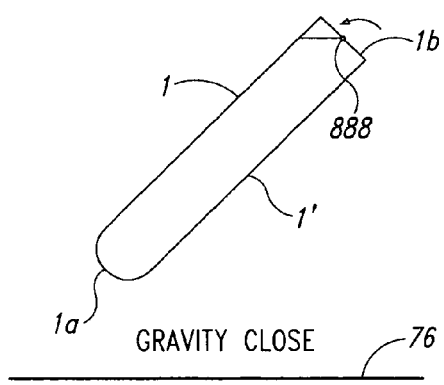

Referring to FIGS. 16A, 16B, 16C and 16D, shown is the operation of an escape craft launch system, with pivot screw 888. Pivot screw 888 is shown centered on rear of craft 1b, FIGS. 16A, 16B, 16C and 16D. In FIG. 16A, craft 1, is shown with smaller escape craft 1z on floor 96a, ready for launch. The arrow shows top half of back of craft, ready to swing down as shown by arrow at pivot screw 888, with a compression cylinder 889, to slow descent of craft top rear half B, as it folds down over bottom half of craft rear C, as shown in opened rear in FIG. 16D. FIG. 16C, shows top rear of craft B, now adjacent and even with bottom half of craft C, and previously unexposed inside portion of craft D, now exposed as exterior side D, with top of craft A adjacent with edge of rear B, now is the bottom section A, in FIG. 16C. FIG. 16B, shows position of craft to effect a gravity opening of craft, and FIG. 16C shows craft ready to launch smaller escape craft 1z, as indicated by arrow. FIG. 16D shows craft position to effect gravity close, with gravity close completed. Earth 76, is also shown. The compression cylinder 889 slows the descent of the closing door, and opening door.

The electric current in conducting wire 97, FIG. 12, entering the encircling bands around aircraft, the first band being band 4a, enters the band as weak current and exits at exit area 14b, as strong current. In a similar manner the magnetic field is increasing as the rotating plasma vortices 19, FIG. 4A, continually rotate around the ferromagnetic craft 1, FIG. 1.

Even though the inductance coil 60, FIG. 10, when connected with the capacitance system 99, FIG. 12, established the north pole 50, FIG. 1, and a south pole 51, FIG. 1, and the craft has an oscillatory circuit, the craft has a fixed magnetic north pole with fluctuating direct current with an alternating current component.

None of the craft systems requires an external source of fuel to be provided, other than from the atmosphere, to include radiation produced atmospheres on moons, plane toids, asteroids, or planets, as sources for the noble gases helium, neon, argon, krypton, xenon, and radon. Xenon is possibly a preferred fuel source, due to its heavy weight and use as a proton fuel in proton accelerators. An abundant source of helium on moonlets or asteroids, or other bodies in space, would encourage its use as a gravity defeating element. Men or women, can safely breathe in a helium atmosphere with only breathing plugs in nose, as one mostly exhales when talking. A helium supported craft would be much safer within a gravity environment.

Though the plasma guns can be used for emergency flight, the primary use for the plasma guns is as a navigational system with the proton accelerator. The plasma gun can raise the rear of the craft, permitting the proton accelerator to accelerate in a downward direction, or the converse, the most forward of the plasma guns can raise the front of craft, permitting the proton accelerator to move the craft in an upward direction. The plasma gun can also be used for emergency movement, abruptly forward or backward, upward, downward, or to the left or to the right, concurrent with proton accelerator or rotating plasma vortices, and then continuing in original flight direction.

An increase in energy to the encircling bands of uninsulated wire around craft, from the capacitance system through the electric wiring system, leads to an increase in rotation of the plasma vortices, and a lengthening of vortices, and an increase in speed of craft. Simultaneously, an increase in number of available protons, permits an increased supply of protons as fuel to the proton accelerator, and an increase in thrust and speed of craft.

The vast array of capacitors also may have some potential as an emergency landing system by means of a potential levitation effect from the vast array of asymmetrical capacitors possessed by craft.

To launch the craft from the ground, the plasma vortices are initiated. The rotating vortices would slowly raise the front of craft, as the vortices form. The craft will be raised in front at a slant with the earth, before the craft is vertical, the proton accelerator will become functional, and provide a forward thrust to craft, while the plasma vortices are raising the front of craft. The craft will travel parallel with the earth with nose of craft slightly elevated. The thrust of the proton accelerator against the ground, will rapidly cause the craft to rise. Or, alternatively, the plasma guns could raise the craft off the earth, with the forward plasma gun raising nose of craft sufficient to permit the proton accelerator rear thrust against the ground, to cause the craft to become airborne.

As the proton accelerator requires the plasma vortices to become functional, prior to operation of accelerator, the best method for craft take off, would be, rotating plasma vortices and proton accelerator. Craft instruments, gauges and diagnostic controls for flight control are shown in FIG. 15.

As the plasma vortices 19, 19', FIG. 4A comprised of energetic charged particles, rotate around the ferromagnetic craft, the craft will be raised to high magnetic fields. This energy will be stored within the plasma field 19, and the magnetic field 18, and within the connected electric system and inductance coil, the inductance coil accessing the magnetic field energy, and also connected to the vast array of capacitors.

End of operation section of preferred embodiment.

Beginning a description of the preferred embodiment for structure of aircraft.

Referring to FIGS. 1, 2, 3, 13 and 14, a Tubular Space Craft (TSC), also called aircraft, craft, submersible craft, and interstellar space craft, is shown. The craft is comprised of a body hull 1, 1', and seven encircling uninsulated conducting bands 4a, 4b, 2a, 2b, 3a, 3b, and 3c, wrapped perpendicular to front 1a and rear 1b of craft. The bands are comprised of tungsten material in preferred embodiment. The craft is comprised of the material tungsten steel in preferred embodiment, a ferromagnetic material, and craft is approximately 72 feet in length and 16 feet in width. The plurality of bands in sets 4a, 4b, and 2a, 2b, and 3a, 3b, 3c, are comprised of tungsten wire wound into cable, and cables are then wrapped to form bands. Front end impact cap 5, and rear impact cap 6, are comprised of the material cobalt steel. The caps are replaceable from within interior of craft. Conducting tungsten wire in band 4a enters as an individual wire wound cable at entrance area 14a, wraps band 4a, and exits at exit area 14b, wrapped in direction shown at arrow at entrance area 14a.

In band 4b, wire cable identical to band 4a, wraps band 4b, entering at entrance area 14c, and exiting at exit area 14d. In the next set of two bands, bands 2a and 2b, wire cable identical to band 4a, enters as an individual wire wound cable at entrance area 12a, wraps in direction of arrow at entrance area 12a, wraps forming band 2a, and cable exits at exit area 12b. In the adjacent band, band 2b, wire cable identical to band 4a, enters at cable entrance area 12c, wraps forming band 2b, and exits at cable exit area 12d. In the next set of three bands, bands 3a, 3b, and 3c, wire cable identical to band 4a, enters as an individual wire wound cable at entrance area 13a, and wraps in direction of arrow at entrance area 13a, forming band 3a, cable then exits at exit area 13b.

In the next adjacent band, band 3b, wire cable identical to band 4a, enters at cable entrance area 13c, and wraps in direction of arrow at entrance area 13c, forming band 3b, cable then exits area at exit area 13d, in the last band, wire cable identical to band 4a, enters as individual wire wound cable at entrance area 13e, and wraps in direction of arrow at entrance area 13e, and cable then exits at cable exit area 13f. Also shown is front proton attraction rejection electrode 736.

Also shown on front end 1a of craft is magnetic north pole 50, and magnetic south pole 51 at rear end 1b, of craft.

Figure 7:
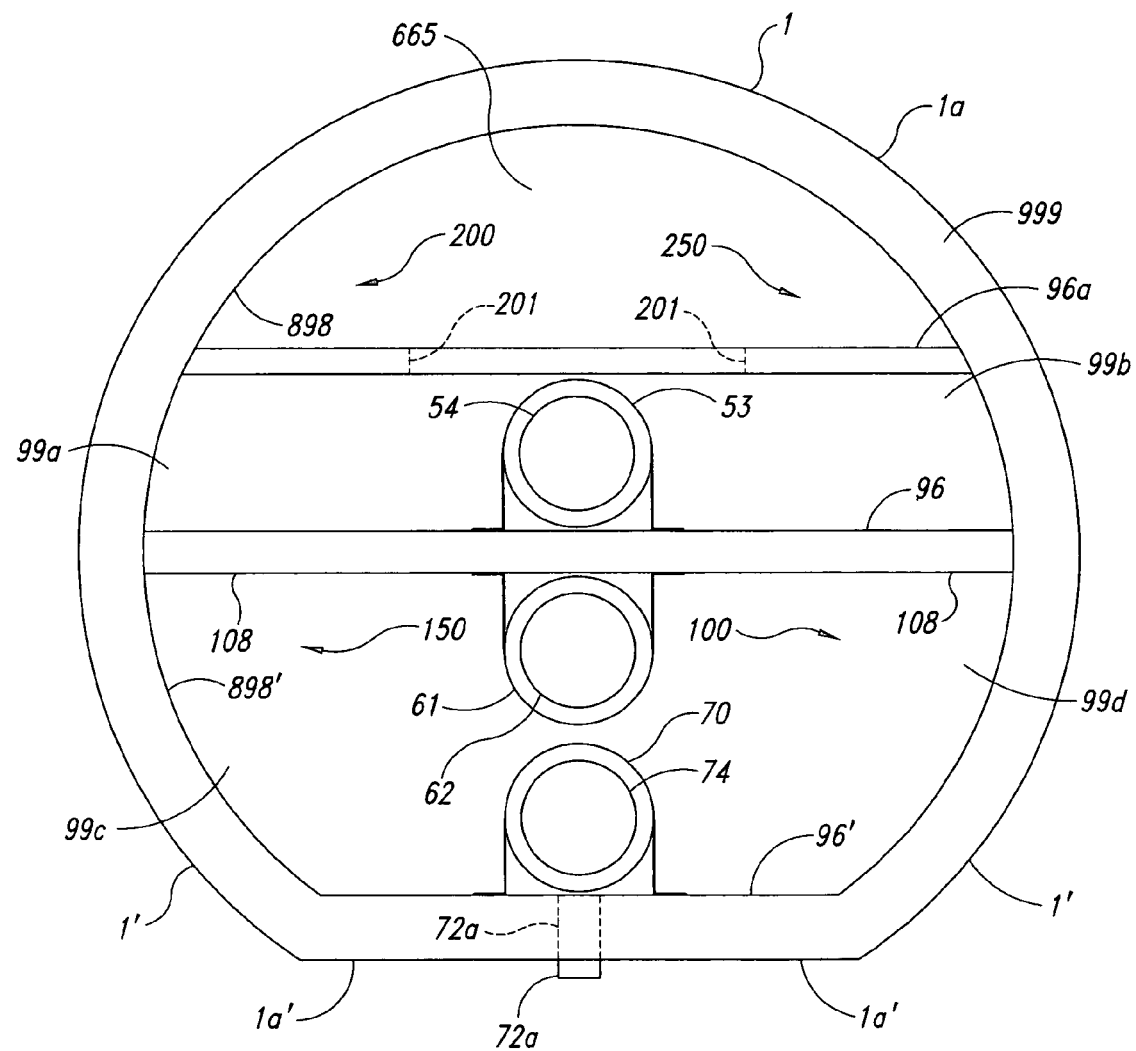
FIG. 7 shows a cutaway rear side view of the craft showing a top deck and a proton accelerator, a lower deck and an inductance coil affixed to the roof, and a plasma gun shaft affixed to the deck, and an orthogonal front-side view of a plasma gun barrel protruding through the lower deck.
Figure 8:
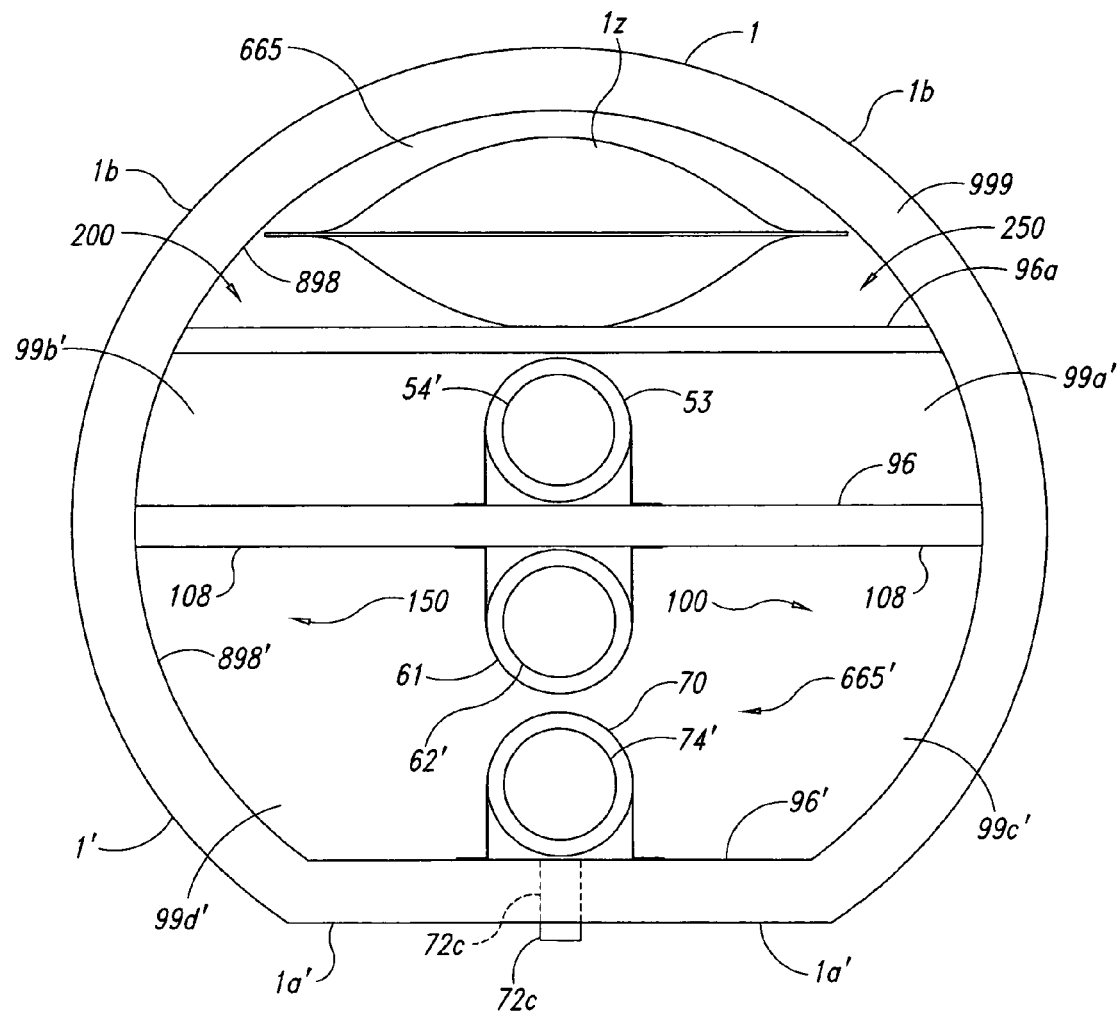
FIG. 8 shows a cutaway rear side view of the craft showing a top deck and a proton accelerator, a lower deck and an inductance coil affixed to the roof, and a plasma gun shaft affixed to the lower deck, and an orthogonal rear side view of a plasma gun barrel protruding through the lower deck. Also shown is a side view of an escape craft, located on the aircraft top deck.

Shown on bottom of craft is craft flat landing surface 1a', best seen in FIGS. 7 and 8.

Referring to FIGS. 2, 3, 13 and 14, craft uninsulated conducting band 4a, direction of electric current is shown by arrow 9a, in band 4b direction of electric current is shown by arrow 9b, in band 2a, direction of electric current is shown by arrow 7a, in band 2b, direction of electric current is shown by arrow 7b, in band 3a, direction of electric current is shown by arrow 8a, in band 3b direction of electric current is shown by arrow 8b, and in the last band, band 3c, direction of electric current is shown by arrow 8c.

Referring to FIGS. 2 and 3, protons are shown projected with a lorentz force toward magnetic north pole 50 and electrode 726, on front of craft. Also shown is the proton effusion 27a, and 27a', simultaneously, protons 666 are shown projecting toward the north pole 50 and electrode 726. simultaneously electrons 666' are shown projecting toward the south pole 51, from opposite ends of rotating plasma vortex 19, 19', FIG. 3. Protons from effusions 27b and 27b' are impacting impact cap 5, and being projected to the left, and toward proton electrode 726 toward north pole, and also into front entrance 54 of proton accelerator 53. In the rear of craft, effusions 26d, and 26d', electrons, are being projected to the right, to bind with exiting protons from rear exit of proton accelerator 54', at rear of craft 1b, at south pole 51. By binding with exiting protons, the protons are neutralized and will not be attracted back to a now negatively charged craft. In the front of craft, impacting protons 666 are also attracted to front of craft 1a. In the rear of craft 1b, impacting electrons 666' from the rotating plasma vortex 19', FIG. 3, impact the rear impact cap 6, and are projected to the right into the path of the exiting protons from proton accelerator rear 54', binding with protons, neutralizing protons, and preventing their attraction back to a now negatively charged craft, with loss of thrust.

The impact electrons 666' also are landing near the undersurface of craft 1', and also strike impact cap 6, on bottom and side surfaces, projecting toward the rear. Also shown in FIG. 2 are vacuum areas 31, 31', and 29, 29', and 30, 30', formed beneath the overarching, coalescing particle effusions.

Also shown are the following effusions that coalesce to form the rotating plasma vortices 19, 19', FIG. 4A.

Referring to FIGS. 2 and 3, electron effusion 27a, 27a', is shown merging with electron effusion 28a, 28a' and being projected with a lorentz force into larmor orbits within the rotating plasma vortices 19, 19', FIG. 4A, and, adjacent proton effusion 28b, 28b', is shown merging, being projected with a lorentz force, with proton effusion 23b, 23b', and being projected into larmor orbits within the rotating plasma vortices 19, 19', FIG. 4A. Adjacent large electron effusion 23a, 23a', is shown being projected with a lorentz force into large electron effusion 24a, 24a', and being projected into larmor orbiting particle fields within plasma vortices 19, 19', FIG. 4A.

Adjacent smaller proton effusion 24b, 24b', is shown being projected with a lorentz force into proton effusion 25b, 25b', and then being projected into larmor orbits within plasma vortex 19, FIG. 4A, comprised of vortices 19, a top vortex, and 19', a bottom vortex. Adjacent larger electron effusion 25a, 25a', is shown being projected with a lorentz force into electron effusion 26a, 26a', and being projected into larmor orbits within plasma vortices 19, 19', FIG. 4A. Shown adjacent is smaller proton effusion 26b, 26b', being projected with a lorentz force and merging with smaller proton effusion 26c, 26c', and being projected into larmor orbiting particle plasma field 19, 19', FIG. 4A.

Referring to FIG. 3, shown is plasma vortex 19, 19', after receiving additional energy effusions, expanding into a larger dashed lines vortex 19, 19', FIG. 3. The smaller vortex, solid lines vortex 19, 19', is shown with a top diamagnetic half 19, and a lower diamagnetic half, 19'. The upper half of plasma in the unexpanded plasma, connects quadrants 19a, 19b', and, in the lower half of the plasma quadrants, 19a', 19b' are connected.

In the expanded plasma vortex, also 19, 19', after expanding, the following quadrants are shown an upper 19, 19', an upper 19a, 19b', and in the lower quadrants, also a quadrant 19, 19', and a quadrant 19a', 19b'.

Within the unexpanded applied magnetic field, shown in the upper half of the applied magnetic field 18, are halves of field 18, 18', in the unexpanded field, on top half, and 18, 18', on bottom half. Also shown in the unexpanded bottom is quadrant 18a' and 18b'. On the top half, quadrant 18a, 18b, is shown. Expanded quadrants are 18, 18', and 18a, 18b on top half of plasma, and 18, 18', and 18a' and 18b' on bottom half of plasma.

Referring to FIG. 4A, craft 1, 1', is shown positioned perpendicular within the plasma field 19, 19', FIG. 4A, relative with earth 76, FIG. 4B. Energetic charged particles, electrons and protons, are rotating in inhomogeneous, diamagnetic, concentric bands of electrons and protons, being separate bands of protons and then electrons. The rotating, orbiting energetic-charged particles, are increasing in energy as they rotate in orbits within the applied magnetic field of the craft 1, 1', increasing in energy as they increasingly narrow in orbits toward the north pole 50, and said particles are moving in orbits, said orbits also increasingly narrowing as they move in orbits toward the south pole 51, as they increase in energy toward the speed of light.

The craft 1, 1', is also increasing in energy as the energetic charged particles encircling the ferromagnetic craft, increasingly magnetize the craft, in increasingly more energetic orbits. Concurrently, the electric field is increasing in energy.

The craft electric field, and the electric field within the magnetohydrodynamic electric current within the electrically conducting plasma current, a large current, is increasing in energy as it rotates diamagnetically, perpendicular within the vertical applied magnetic field, a force opposite the magnetic north pole is effected, from the bottom of the craft, downward. In combination with the proton accelerator 53, FIG. 9, said force energizing ejected protons from rear of proton accelerator, propelling the craft upwards. This propulsive force will be maintained. The electrons and protons are both rotating, orbiting to the right within the applied magnetic field. There exist internationally accepted equations predicting this craft, and how it would operate, and the craft's potential. This craft has the potential to travel to other solar systems with planets, at no cost, other than cost of construction of craft.

Also shown in FIG. 4A, are quadrants of plasma field 19, 19', being quadrants 19a, 19b, and 19a', 19b'. Narrowing plasma orbits are shown impacting craft at impact area 666, producing protons as fuel for proton accelerator at proton accelerator entrance 54, and narrowing plasma particle orbits are shown impacting craft at impact area 666', producing electrons to bind with exiting protons at proton accelerator exit 54', thereby preventing exiting protons from being attracted back to a now negatively charged craft, most likely.

Referring to FIG. 4B, shown is a preferred orientation of craft 1, with earth 76, being angle 667, between craft and ground, for maximum efficiency in propulsion. At angle 667, one half of the potential plasma vortex propulsion, shown at a maximum in FIG. 4A, is shared with one half of proton accelerator maximum propulsion potential, shown at arrow 668. Plasma propulsion potential is at a maximum when craft is positioned relative to plasma as shown in FIG. 4A. Front of craft in FIG. 4B is shown at 1a and rear at 1b. Arrow 668 shows direction of travel of craft.

Referring to FIGS. 5 and 6, shown in FIG. 5 is a cutaway side view of rear 1b of craft 1, showing the direction of rotation of craft plasma vortex 19, when viewed from rear of craft looking up. Shown are arrow 88', indicating direction of rotation of plasma. Also shown is craft magnetic south pole 51, and bottom of craft 1', and plasma vortex bottom vortex 19'. Shown in FIG. 6, is a cutaway front side view of craft 1, showing front of craft 1a, magnetic north pole 50, front entrance 54 of proton accelerator, plasma vortex 19, and arrow 88 showing direction of rotation of plasma vortex when viewed from front of craft.

Referring to FIG. 7, shown is a cutaway front side view of the craft 1, entrance 54 for proton accelerator and proton accelerator 53, attached to upper deck floor 96. An inductance coil shaft 61, is shown attached to lower deck ceiling 108. Also shown is front entrance 62, for inductance coil. Fastened to lower deck floor 96', is plasma gun shaft 70 for linear plasma accelerator 75, FIG. 11, said linear plasma accelerator for serving craft plasma guns. Also shown is plasma gun barrel 74, for plasma gun 71a, FIG. 11. Also shown in FIG. 7 is front of plasma gun barrel 74, and shown also shown is a cutaway portion of plasma gun barrel 72a, and an adge of protruding plasma gun barrel 72a. Also shown is flat bottom landing surface 1a', for craft 1, 1', and miscellaneous personnel and crew spaces 150, and 100, on lower deck, and 200, and 250, on upper deck. Also shown are capacitor spaces 99c and 99d, on lower deck, and 99a, and 99b on upper deck 96. Lower deck wall 898', is shown, and upper deck wall ceiling 898. Also shown is miscellaneous space 665, on upper deck. An upper deck for aircraft 96a, is shown, though this deck is located in rear of craft.

Front of craft 1a, is shown, and bottom of craft 1' is also shown. Interior insulation 999, between craft walls is shown. Lift out panels 201, to permit work on proton accelerator beneath aircraft upper deck 96a, is shown.

Referring to FIG. 8, shown is a cutaway rear side view of the craft 1, showing escape craft 1z, one of three escape craft, located on upper craft deck 96a, also shown is rear exit 54' for a proton accelerator, and rear 54' of proton accelerator 53, FIG. 9, is shown attached to upper deck floor 96. Below the upper deck an inductance coil shaft 61, is shown attached to lower deck ceiling 108. Also shown is rear exit 62' for inductance coil. Below is located a plasma gun shaft 70, fastened to deck floor 96', and also shown is rear plasma gun barrel 74' for plasma gun 71c, FIG. 11. Also shown is a cutaway portion of plasma gun barrel 72c, and a portion protruding out of craft of plasma gun barrel 72c. Also shown is bottom of craft, flat landing surface 1a', bottom of lower side 1' of craft 1, 1', miscellaneous personnel and crew spaces 150, 100, and 665' on lower deck, and 250, 200 and 665 on upper craft deck 96a. Also shown are capacitor spaces 99d', and 99c', on lower deck and 99b' and 99a' on upper deck 96.

Upper craft deck wall 898 is shown, and also lower deck wall 898'. Insulation 999 between walls is else shown. Rear 1b of craft is also shown. The greater part of the upper deck 96, is not covered by craft upper deck floor 96a, only the rear of deck floor 96.

Referring to FIG. 9, shown is a cutaway right side view of craft 1, 1', showing craft front end 1a, and craft rear end 1b. Also shown, a proton accelerator 53, and proton accelerator front entrance 54. Shown are fasteners to affix proton accelerator to deck floor 96, fasteners 52a, 52b, 52c, 52d, 52e, and 52f, referred to as array of proton accelerator fasteners 52. Also shown are escape craft 1x, 1y and 1z, located on craft upper deck 96a. Shown on upper deck 96a is a superconducting ring 300, within a superconducting ring room 350, with superconducting room walls 350a and 350a', and doors 350b, and 350b'. Also shown is a rear exit for proton accelerator, a proton accelerator exit 54'. Also shown is magnetic north pole 50, and south pole 51, and lower deck floor 96'. An exterior craft exit door 888, is shown, also shown is an array of accelerating electrodes 670, 671, 672, and 673, also called alternating electrodes. Shown on roof of craft are a front pilot copilot cabin 95a, and a rear pilot copilot cabin 95b. The cabins can be retracted. When accelerating with front of craft in front, rear pilot copilot cabin 95b, will be retracted to cabin retract area 95b', when craft is decelerating with front of craft to the rear, and rear of craft to front, cabin 95b, will be raised, and cabin 95a will be retracted to cabin retract area 95a'.

Referring to FIG. 10, shown is a cutaway right side view of the craft 1, 1', showing an inductance coil 60, within an inductance coil shaft 61. Shown in front of craft is inductance coil front end 62. Also shown in front of craft is magnetic north pole 50, and inductance coil electromagnetic front emission arrow 699, and in rear is shown inductance coil rear end 62', and inductance coil electromagnetic rear emission arrow 699'. Also shown is a magnetic south pole 51. Fasteners to affix inductance coil to lower deck ceiling 108, are shown as fasteners 60a, 60b, 60c, and 60d. Also shown is lower deck floor 96'.

Referring to FIG. 11, shown is a cutaway left side view of craft 1, 1', depicting an extensive plasma gun system 70, comprising plasma gun shaft 70, a connecting factor, and plasma gun 71a with two plasma gun barrels, barrel 72a' toward front of craft, and barrel 72a, on the bottom front of craft. Also connected to plasma gun 71a is linear plasma accelerator 853, bringing plasma from roof of craft, through plasma gun barrel 72a' to front of craft, or through plasma gun barrel 72a, to bottom of craft. Arrangement of linear plasma accelerator 853, also provides a lorentz force to further accelerate plasma. In rear of craft plasma gun 71c, also has two gun barrels, gun barrel 72c' and gun barrel 72c. Barrel 72c' provides plasma out the rear of craft, and plasma gun barrel 72c, provides plasma out the bottom rear of craft. Both barrels are connected to plasma gun 71c, and to linear plasma accelerator 853', from roof of craft. In the middle of plasma gun shaft is plasma gun 71b, connected to bottom plasma gun barrel 72b. Plasma gun shaft 70, is affixed to deck 96' by fasteners 70a, 70b, 70c, 70d, 70e, and 70f. The fasteners can be considered plasma gun shaft fasteners. The front of plasma gun shaft 74, and rear of plasma gun shaft, plasma gun shaft rear 74', are indicated. Also shown is interior linear plasma accelerator 75, located within plasma gun shaft 70, and able to access all three plasma guns, including those plasma guns being accessed by either linear plasma accelerator 853 or 853'. Shown is magnetic north pole 50 and south pole 51, and upper deck floor 96.

Referring to FIG. 12, shown is a cutaway right side view of craft 1, 1', showing a vast array of capacitors, referred to as capacitor array 99, comprising plates 701a, a', 701b, b', 701c, c', 701d, d', 701e, e', 701f, f', 701g, g', 701h, h', 701i, i', 701j, j', and 702a, a', 702b, b', 702c, c', 702d, d', 702e, e', 702f, f', 702g, g', 702h, h', 702i, i', 702j, j', and 703a, a', 703b, b', 703c, c', 703d, d', 703e, e', 703f, f', 703g, g', 703h, h', 703i, i', 703j, j', and 704a, a', 704b, b', 704c, c', 704d, d', 704e, e', 704f, f', 704g, g', 704h, h', 704i, i', 704j, j', and 705a, a', 705b, b', 705c, c', 705d, d', 705e, e', 705f, f', 705g, g', 705h, h', 705i, i', 705j, j', and 706a, a', 706b, b', 706c, c', 706d, d', 706e, e', 706f, f', 706g, g', 706h, h', 706i, i', 706j, j', and 707a, a', 707b, b', 707c, c', 707d, d', 707e, e', 707f, f', 707g, g', 707h, h', 707i, i', 707j, j', and 708a, a', 708b, b', 708c, c', 708d, d', 708e, e', 708f, f', 708g, g', 708h, h', 708i, i', 708j, j', and 709a, a', 709b, b', 709c, c', 709d, d', 709e, e', 709f, f', 709g, g', 709h, h', 709i, i', 709j, j', and 710a, a', 710b, b', 710c, c', 710d, d', 710e, e', 710f, f', 710g, g', 710h, h', 710i, i', 710j, j', and 711a, a', 711b, b', 711c, c', 711d, d', 711e, e', 711f, f', 711g, g', 711h, h', 711i, i', 711j, j', and 712a, a', 712b, b', 712c, c', 712d, d', 712e, e', 712f, f', 712g, g', 712h, h', 712i, i', 712j, j', and 713a, a', 713b, b', 713c, c', 713d, d', 713e, e', 713f, f', 713g, g', 713h, h', 713i, i', 713j, j', and 714a, a', 714b, b', 714c, c', 714d, d', 714e, e', 714f, f', 714g, g', 714h, h', 714i, i, 714j, j', and 715a, a', 715b, b', 715c, c', 715d, d', 715e, e', 715f, f', 715g, g', 715h, h', 715i, i', 715j, j', and 716a, a', 716b, b', 716c, c', 716d, d', 716e, e', 716f, f', 716g, g', 716h, h', 716i, i', 716j, i', and 717a, a', 717b, b', 717c, c', 717d, d', 717e, e', 717f, f', 717g, g', 717h, h', 717i, i', 717j, j', and 718a, a', 718b, b', 718c, c', 718d, d', 718e, e', 718f, f', 718g, g', 718h, h', 718i, i', 718j, j', and 719a, a', 719b, b', 719c, c', 719d, d', 719e, e', 719f, f', 719g, g', 719h, h', 719.i, i', 719j, j', and 720a, a', 720b, b', 720c, c', 720d, d', 720e, e', 720f, f', 720g, g', 720h, h', 720i, i', and 720j, j'. Shown are 200 capacitor sets.

Also shown in FIG. 12 is insulated conducting copper wire 97, connecting the vast array of capacitors on top capacitors to front of inductance coil 62, and bottom of capacitors to inductance coil rear 62'. Also shown are inductance coil fasteners 60a, 60b, 60c, and 60d securing the inductance coil 60, to ceiling 108 of lower deck 96'.

Also shown is front of craft 1a, and rear of craft 1b, and the magnetic north pole 50, and south pole 51. Located on an upper level is a superconducting ring 300, in a superconducting room 350, with walls 350a, and 350a', and doors 305b, and 350b'. Also shown on upper deck are locations of capacitor arrays 99, in front of craft and in rear of craft, on upper deck. Upper deck floor 96, and aircraft upper deck floor 96a, are shown. Storage area 401 for diversion devices is shown. Also shown is plasma gun shaft 70, containing an array of plasma gun barrels, plasma gun barrel 72a' in front of craft, plasma gun barrel 72a on bottom front of craft, plasma gun barrel 72b, in middle of bottom of craft, and plasma gun barrel 72c on bottom rear of craft, and plasma gun barrel 72c' in rear of craft.

Referring to FIG. 13, shown is diversion device 400, located in front of craft, comprising diversion electrode arms 401, pointing to rear of craft, 402, pointing upward, and 403, pointing downward, and diversion electrode arm 408, is pointing toward the front of craft, and is connected to front extended electrode 407. On bottom of diversion device 400, is connection stand 409, for electric connection. In rear of craft, is diversion device 400', comprising diversion electrode arms 401', pointing to front of craft, 402', pointing upward, 403', pointing downward, and 408', pointing to the rear, and connected to rear extended electrode 407'. On bottom of diversion device 401', is connection stand 409', for electric connection.

Diversion devices 400 and 400', are located on top surface of craft 1, FIG. 13.

Referring to FIG. 14, shown are diversion devices 400 and 400', located on top surface of craft 1. A left separated segmented view is shown and a right separated segmented view is also shown. In right segmented view, electrode arm 403' is shown receiving electrons from band 3c, the arrow at arm 403' shows direction of travel of received electrons, and the same arrow is shown expelling the electrons at electrode arm 402' toward rear of craft in a cascade of electrons indicated by bracketed minus sign, headed toward rear of craft within electron cascade 996'. electrode arm 408', on bottom of device, is shown receiving protons from rear of craft from rear extended electrode 407' as indicated by bracketed plus sign, and arrow.

The received protons in electrode arm 408' are shown moving in direction of arrow within extended electrode arm 407', and exiting at electrode arm 401', as indicated by arrow, in a cascade of protons 995' as indicated by bracketed plus sign in middle of cascade 995', headed toward front of craft and proton accelerator. The rear diversion device 400' is shown mounted on electric connection stand 409'.

In front of craft represented by separated segmented front portion of FIG. 14, shown is diversion device 400, showing electrode arm 408 receiving electrons from extended electrode arm 407, and path of electrons through diversion device is shown by arrows with electrons exiting at electrode arm 401 in a cascade of electrons 996, shown by bracketed minus sign, and moving in a direction toward rear of craft to bind with exiting protons from proton accelerator. Also shown are protons being received by electrode arm 403, from off band 4a, and direction of movement with diversion device is shown by arrows, with protons exiting at electrode arm 402 as shown by cascade 995 and bracketed plus sign as a cascade of protons toward entrance to proton accelerator in front of craft.

Referring to FIG. 14A, shown are craft extrusion, retraction holes to remove and install separated parts of diversion devices. Small hole 851 is for electrode arm 402, small hole 852 is for electrode arm 403. Large hole 850 is for electrode arms 408 and 401. The largest hole 853, is for the connection stand 409, and separated parts of diversion device, within designated smaller holes. Hole 853 is for diversion device 400, FIG. 13.

Referring to FIG. 14B, shown are craft extrusion, retraction holes to remove and install separated parts of diversion devices, specifically, hole 853', is for diversion device 400', FIG. 13. Small hole 851' is for electrode arm 402', small hole 852' is for electrode arm 403'. Large hole 850' is for electrode arm 408' and 401'. The largest hole 853', is for the connection stand 409', and separated parts of diversion device, within designated smaller holes. Hole 853' is for diversion device 400'.

Referring to FIG. 15, shown is a craft detachable, rotating living module 760, and also a blowup representation of pilot copilot cabin 95a, but also applicable to pilot copilot cabin 95b, cabin 95b being identical to cabin 95a, in every detail except positioning and orientation on top of craft 1. Also shown in FIG. 15, within craft 1, is a water tank, water tank 750, located under bottom deck floor 96', FIG. 7, best seen in FIG. 15. Additionally, a plasma diagnostics panel 555, is shown located within craft 1, located next to retracted rear pilot copilot cabin 95b. The blowups of pilot copilot cabin show front window 799. Shown attached to living module 760, are small propulsion devices 761, 762 and 763 for inducing gravity within living module. The plasma diagnostics control panel 555, operated by a plasma diagnostics engineer, is shown. Aircraft controls 552, for navigating craft with plasma guns, proton accelerator, and with coordination of plasma diagnostics engineer analyzing the plasma vortices, are shown.

Also shown are controls to bank craft, controls 554. To control speed of craft, controls 553, are used. To control the interrelated propulsion systems, aircraft controls 552, are utilized for proton accelerator, plasma gun system, and in coordination with the plasma diagnostics engineer, the plasma vortices. The detachable, rotating living module 760, is rotated by ambient electron powered propulsion devices 761, 762, and 763. Shown in the larger blowup of pilot: copilot cabin 95a, is target monitor 546, showing target destination solar system, and as destination nears, target destination planet. The craft is automatically navigated to destination, however, the system needs to be monitored, constantly. System 546 is also referred to as aircraft control system 546, or aircraft automatic control system 546. Aircraft control gauges are also shown on panel 547 within larger blowup. Pilot copilot window 799, is also shown.

Referring to FIGS. 16A, 16B, 16C, and 16D, shown is an escape craft launch system, escape craft being the designation for escape craft 1x, 1y, and 1z shown in FIG. 9, and escape craft 1z, is shown separately in FIG. 16A. Shown in FIG. 16A, is escape craft 1z, indicated with dashed lines as being within craft. Also shown is top of launch door A, rear top side of launch door B, and right side D, of lowered launch door, FIG. 16C, and, shown in FIG. A is a compression cylinder 889, a pivot screw 888, and the bottom half C of craft rear 1b, FIG. 1.

In FIG. 16B, shown is rear launch door being positioned to gravity open at pivot screw, by raising front end of craft as depicted, the arrow shows direction door will open, and position after door opens. Pivot screw 888 is shown, and front of craft 1a, and rear of craft 1b, and earth 76.

In FIG. 16C, shown is craft with rear opened and aircraft being launched in direction of arrow. Top of craft 1, is shown, and bottom 1'.

FIG. 16D, shows the craft in a position to gravity close door as shown by arrow, door closed, at pivot screw 888.

I claim:

1. A combination aircraft and spacecraft, comprising:
    an elongate fuselage defining a longitudinal fuselage axis running generally from a front end of said fuselage to a back end of said fuselage;
    a plurality of spaced apart first coils wound about said fuselage, each first coil being formed of electrically conductive material connected so as to carry a current such that the direction of said current flowing through any one coil is opposite the direction of said current flowing through the adjacent coil or coils, said coils being adapted in response to said current to produce sufficient heat in said coils to ionize ambient air and thereby produce free electrons and free protons;
    a second coil coupled in parallel to a plurality of capacitors so as to produce a resonating circuit, said second coil being elongate and defining a longitudinal coil axis that is aligned substantially with said fuselage axis; and
    a proton accelerator having a proton input disposed generally at said front end of said fuselage, and a proton output disposed generally at said back end of said fuselage, wherein said second coil is adapted to produce a magnetic field for interacting with the free protons so as to induce the free protons to enter said proton input.

2. The combination aircraft and spacecraft of claim 1, wherein said proton accelerator includes a series of electrodes spaced apart along said longitudinal axis, said electrodes being charged by said resonating circuit so that adjacent electrodes have alternating charges.

3. The combination aircraft and spacecraft of claim 2, wherein said fuselage is ferromagnetic.

4. The combination aircraft and spacecraft of claim 3, wherein said electrically conductive material consists essentially of tungsten.

5. The combination aircraft and spacecraft of claim 4, including a charged particle impact shield formed of cobalt disposed at said front end.

6. The combination aircraft and spacecraft of claim 3, including a charged particle impact shield formed of cobalt disposed at said front end.

7. The combination aircraft and spacecraft of claim 2, wherein said electrically conductive material consists essentially of tungsten.

8. The combination aircraft and spacecraft of claim 7, including a charged particle impact shield formed of cobalt disposed at said front end.

9. The combination aircraft and spacecraft of claim 2, including a charged particle impact shield formed of cobalt disposed at said front end.

10. The combination aircraft and spacecraft of claim 2, including a charged particle impact shield formed of cobalt disposed at said back end.

11. The combination aircraft and spacecraft of claim 1, wherein said fuselage is ferromagnetic.

12. The combination aircraft and spacecraft of claim 11, wherein said electrically conductive material consists essentially of tungsten.

13. The combination aircraft and spacecraft of claim 12, including a charged particle impact shield formed of cobalt disposed at said front end.

14. The combination aircraft and spacecraft of claim 11, including a charged particle impact shield formed of cobalt disposed at said front end.

15. The combination aircraft and spacecraft of claim 11, including a charged particle impact shield formed of cobalt disposed at said front end.

16. The combination aircraft and spacecraft of claim 1, wherein said electrically conductive material consists essentially of tungsten.

17. The combination aircraft and spacecraft of claim 16, including a charged particle impact shield formed of cobalt disposed at said front end.

18. The combination aircraft and spacecraft of claim 1, including a charged particle impact shield formed of cobalt disposed at said front end.

19. The combination aircraft and spacecraft of claim 1, including a charged particle impact shield formed of cobalt disposed at said back end.

* * * * *